(12) United States Patent
Bertani et al.

(10) Patent No.: US 10,534,600 B2
(45) Date of Patent: Jan. 14, 2020

(54) METHOD AND SYSTEM FOR UNIFORM REMOTE MANAGEMENT OF NETWORK DEVICES

(71) Applicant: Tanaza S.r.l., Milan (IT)

(72) Inventors: Sebastiano Bertani, Milan (IT); Cristian Piacente, Milan (IT); Rocco Folino, Milan (IT)

(73) Assignee: TANAZA S.R.L., Milan (IT)

( * ) Notice: Subject to any disclaimer, the term of this patent is extended or adjusted under 35 U.S.C. 154(b) by 293 days.

(21) Appl. No.: 15/527,378

(22) PCT Filed: Nov. 12, 2015

(86) PCT No.: PCT/EP2015/076431
§ 371 (c)(1),
(2) Date: May 17, 2017

(87) PCT Pub. No.: WO2016/079002
PCT Pub. Date: May 26, 2016

(65) Prior Publication Data
US 2017/0337051 A1    Nov. 23, 2017

(30) Foreign Application Priority Data
Nov. 19, 2014 (EP) ..................................... 14193805

(51) Int. Cl.
*G06F 8/65* (2018.01)
*H04L 12/24* (2006.01)
(Continued)

(52) U.S. Cl.
CPC .............. *G06F 8/65* (2013.01); *H04L 41/082* (2013.01); *H04L 41/0853* (2013.01);
(Continued)

(58) Field of Classification Search
CPC ........................... G06F 8/65–71; H04L 41/082
See application file for complete search history.

(56) References Cited

U.S. PATENT DOCUMENTS 6,012,100 A * 1/2000 Frailong ............... H04L 41/082
709/220
7,852,819 B2 12/2010 Gil
(Continued)

FOREIGN PATENT DOCUMENTS

EP    2547042    1/2013

OTHER PUBLICATIONS

Sandeep Adwankar et al., "Universal Manager: seamless management of enterprise mobile and non-mobile devices", 2004 [retrieved on Oct. 11, 2019], IEEE International Conference on Mobile Data Management, pp. 1-12, downloaded from https://ieeexplore.ieee.org. (Year: 2004).*
(Continued)

Primary Examiner — Thuy Dao
Assistant Examiner — Stephen D Berman
(74) Attorney, Agent, or Firm — Clayton, McKay & Bailey, PC

(57) ABSTRACT

Method and system (10) of remote management in a network (2, 100), the network (2, 100) comprising a plurality of nodes (110) to be managed by a remote controller (1), the nodes (110) having each at least one characterizing parameter corresponding to any of predetermined instances of said at least one characterizing parameter, said at least one characterizing parameter being selected from the group consisting of: vendor, model, hardware version, firmware version, chipset type, wherein: the remote controller (1) identify the nodes (110), including identification of said at least one characterizing parameter; the remote controller (1) accesses a database (14) comprising said predetermined
(Continued)

instances of said at least one characterizing parameter associated with respective upgrade procedures and controller firmwares, specific for each instance of said at least one characterizing parameters, the controller firmwares implementing a uniform set of features among the nodes (110) and enabling the nodes (110) to be managed by the remote controller (1) by means of a uniform set of managing procedures; for each identified node (110), the remote controller (1) retrieves from said database (14) the specific upgrade procedure and the specific controller firmware, which are associated in said database (14) with the instance corresponding to said at least one characterizing parameter identified for the node (110); the remote controller (1) executes, for each identified node (110), the retrieved specific upgrade procedure for loading the retrieved specific controller firmware onto the node (110). After the specific controller firmwares are loaded onto the respective nodes (110), the remote controller (1) manages the nodes (110), according to the uniform set of features and by using the uniform set of managing procedures.

14 Claims, 15 Drawing Sheets

(51) Int. Cl.
*H04L 29/12* (2006.01)
*H04L 29/08* (2006.01)
(52) U.S. Cl.
CPC .......... *H04L 41/0886* (2013.01); *H04L 41/20* (2013.01); *H04L 61/103* (2013.01); *H04L 61/2007* (2013.01); *H04L 61/2046* (2013.01); *H04L 67/34* (2013.01); *H04L 61/6022* (2013.01)

(56) References Cited

U.S. PATENT DOCUMENTS

| 8,250,567 | B2* | 8/2012 | Gesquiere | G06F 8/65 |
| | | | | 717/173 |
| 8,891,404 | B2* | 11/2014 | Bertani | H04L 41/046 |
| | | | | 370/254 |
| 2002/0073304 | A1* | 6/2002 | Marsh | G06F 8/65 |
| | | | | 713/1 |
| 2002/0157018 | A1* | 10/2002 | Syvanne | H04L 41/082 |
| | | | | 726/6 |
| 2002/0161863 | A1 | 10/2002 | McGuire | |
| 2004/0015952 | A1* | 1/2004 | Lajoie | G06F 8/65 |
| | | | | 717/171 |
| 2007/0005738 | A1* | 1/2007 | Alexion-Tiernan | |
| | | | | H04L 41/0853 |
| | | | | 709/223 |
| 2007/0028228 | A1* | 2/2007 | Battista | G06F 8/65 |
| | | | | 717/168 |
| 2008/0285575 | A1 | 11/2008 | Biswas | |
| 2008/0294759 | A1 | 11/2008 | Biswas | |
| 2008/0304427 | A1 | 12/2008 | Biswas | |
| 2009/0064192 | A1* | 3/2009 | Betts | H04L 41/0853 |
| | | | | 719/318 |
| 2010/0058329 | A1 | 3/2010 | Durazzo | |
| 2011/0083129 | A1* | 4/2011 | Masaki | G06F 8/65 |
| | | | | 717/175 |
| 2012/0198435 | A1* | 8/2012 | Dirstine | G06F 8/65 |
| | | | | 717/173 |
| 2012/0331181 | A1* | 12/2012 | Govande | G06F 8/65 |
| | | | | 710/8 |
| 2013/0016628 | A1* | 1/2013 | Bertani | H04L 41/046 |
| | | | | 370/255 |
| 2013/0227543 | A1* | 8/2013 | Chen | G06F 8/654 |
| | | | | 717/173 |
| 2013/0275956 | A1* | 10/2013 | Lai | G06F 8/65 |
| | | | | 717/170 |
| 2014/0101653 | A1* | 4/2014 | Dharmadhikari | G06F 8/65 |
| | | | | 717/173 |

OTHER PUBLICATIONS

D. Makowski et al., "Firmware Upgrade in xTCA Systems," 2013 [retrieved on Oct. 11, 2019], IEEE Transactions on Nuclear Science, vol. 60, Issue 5, pp. 3639-3646, downloaded from https://ieeexplore.ieee.org. (Year: 2013).*

Goran Jurkovic et al., "Remote firmware update for constrained embedded systems," 2014 [retrieved on Oct. 11, 2019], 37th International Convention on Information and Communication Technology, Electronics and Microelectronics (MIPRO), pp. 1019-1023, downloaded from https://ieeexplore.ieee.org. (Year: 2014).*

International Search Report dated Feb. 15, 2016 for PCT/EP2015/076431.

* cited by examiner

| NODE_SPECIFIC PROCEDURES/FIRMWARE | |
|---|---|
| Vendor xx1, model yy1, firmware version zz1 → Conf. Extraction Proc. A<br>→ Upgrade Procedure A<br>→ Controller Firmware A | Vendor xx2, model yy1, firmware version zz1 → Conf. Extraction Proc. D<br>→ Upgrade Procedure D<br>→ Controller Firmware D |
| Vendor xx1, model yy1, firmware version zz2 → Conf. Extraction Proc. B<br>→ Upgrade Procedure B<br>→ Controller Firmware A | Vendor xx2, model yy1, firmware version zz2 → Conf. Extraction Proc. D<br>→ Upgrade Procedure E<br>→ Controller Firmware D |
| Vendor xx1, model yy2, firmware version zz1 → Conf. Extraction Proc. B<br>→ Upgrade Procedure B<br>→ Controller Firmware B | Vendor xx2, model yy1, firmware version zz3 → Conf. Extraction Proc. E<br>→ Upgrade Procedure E<br>→ Controller Firmware D |
| Vendor xx1, model yy2, firmware version zz2 → Conf. Extraction Proc. C<br>→ Upgrade Procedure C<br>→ Controller Firmware B | Vendor xx2, model yy2, firmware version zz1 → Conf. Extraction Proc. F<br>→ Upgrade Procedure F<br>→ Controller Firmware F |

METHOD AND SYSTEM FOR UNIFORM REMOTE MANAGEMENT OF NETWORK DEVICES

This application is a United States national phase filing of PCT/EP2015/076431, filed Nov. 12, 2015, which claims priority to EP 14193805, filed Nov. 19, 2014, both of which are hereby incorporated by reference herein in their entireties.

The present invention relates to a method and system for remote management of network devices.

The pervasive diffusion of access points and other network devices has increased, in the latest years, the costs the companies and individuals have to afford in order to manage, maintain and monitor this multitude of devices. Managing multiple network devices is a very time consuming task.

The existing methodologies to manage network devices, such as wireless access points, can be classified into two main categories: non-centralized management systems and centralized remote management systems. Each of these classes of solution has some drawbacks as described in the following.

Non-centralized management systems are usually adopted in consumer-grade network devices, for low-end price-sensitive markets. In non-centralized management systems, network administrators configure and monitor each network device individually, with one-by-one operations, using the stock firmware installed and running on the device itself. Different vendors/manufactures implement on their devices proprietary protocols, enabling the network administrators to access the devices.

The drawbacks of this approach are the huge amount of time required to manage each device in a on-by-one fashion; the non homogeneous user interface provided by each vendor/manufacturer; and the increased probability of human mistake as no centralized consistency check algorithm can be adopted.

Examples of centralized remote management systems are described by U.S. Pat. No. 7,852,819, US 2008/0294759, US 2008/0285575, and US 2008/0304427.

Although these systems are attractive from a time saving standpoint, they also exhibit several limitations and pose challenges as described below.

Network devices usually have to operate according to specific procedures in order to be reached and managed by the network administrator, this involving the execution of a firmware compliant with some pre-defined specifications on all controllable devices. The solutions disclosed by the above mentioned patent documents imply that vendor/manufacturers of enterprise-grade network devices develop proprietary methods and solution for centrally configuring their network devices. In particular, each vendor/manufacturer designs the network devices, within the stock firmware, to use a proprietary protocol which enables them to connect to their remote infrastructure only, not to the one of other vendors/manufacturers or 3rd party ones. This means that in order to be enabled to use a centralized software-based remote system provided by a specific vendor/manufacturer, the user is requested to purchase and install in its network only network devices sold/produced by said specific vendor/manufacturer. Network devices from generic vendors/manufacturers, such as for example, low-cost consumer-grade network devices, cannot be managed. In other words, the main limitation of centralized remote management systems is related to the fact that they are vertically integrated: they only work with network devices provided by the same vendor/manufacturer. This fact has a huge cost for the customer, as he/she is locked-in by the vendor/manufacturer: any time he/she has to expand a network, he/she is forced to buy network devices and cloud services from the same vendor/manufacturer, reducing further the customer bargain power over time.

EP 2 547 042 discloses a method and a system for remote management in a network comprising a plurality of nodes, a remote controller and an agent device. The agent device makes initial contact with the remote controller in order to be authenticated by the remote controller and to establish a connection with the remote controller. After the connection is established, the remote controller executes a discovery procedure through intermediation of the agent device for discovering the plurality of nodes. After executing the discovery procedure, the remote controller executes an identification procedure through intermediation of the agent device for identifying the discovered nodes. The remote controller manages the discovered and identified nodes through intermediation of the agent device, by using managing procedures specific for the identified nodes.

The method and system disclosed by EP 2 547 042 allow remote managing of nodes in the same managed network without any assumption/requirement on the behaviour of those nodes. This means that there is no need for the nodes to run a firmware specifically designed to connect to the remote controller and that generic nodes (that is, nodes from any vendor/model/hardware version/firmware version/chipset type, including low-cost consumer-grade network devices) and/or nodes of different vendor/model/hardware version/firmware version/chipset type, can be remotely managed as such, using the stock firmware installed and running on the device itself, without requiring any modification/adjustment.

The Applicant observed that one drawback of the solution disclosed by EP 2 547 042 is that it just allows to remotely and centrally perform actions for which each node is originally designed, according to a predefined stock feature set. Considering that nodes of different vendors/models/hardware versions/firmware versions/chipset types are typically designed according to different feature sets, said solution cannot offer, for such different nodes, a uniform feature set. This may make the network unworkable. For example, some Wi-Fi access points only support WPA-TKIP encryption, while other Wi-Fi Access Points only support WPA-AES encryption. WPA-TKIP and WPA-AES both implement the WPA encryption feature, but according to different specifications. Thus, a system, like that disclosed by EP 2 547 042 that just adds a management layer on top of the existing feature set, is not able to provide consistency in the configurations, as assigning WPA encryption feature to both network devices would result in WPA-TKIP and WPA-AES encryption in different parts of the network, making the network unusable. The same considerations apply, for example, to the so called Captive Portal feature that may be implemented by different vendors/manufacturers according to different specifications. Thus, a splash page designed to work with Buffalo Captive Portal specification will not work with a D-Link Captive Portal specification.

Furthermore, the solution disclosed by EP 2 547 042 does not allow to add advanced cloud-based features, such as, for example, auto-rollback when a configuration sent from the remote controller to the node generates a disconnection, or Wi-Fi clients roaming. These kinds of advanced features are usually not available in low cost devices, especially if they are consumer grade devices not designed to be connected to any cloud infrastructure. Auto-rollback is a cloud-based feature that allows the user to avoid configuring the unit in a wrong way and losing connectivity to it: anytime a new configuration is submitted, if the unit loses connectivity with the cloud infrastructure and cannot connect for more than a specified number of minutes, the unit rolls back the configuration automatically, applying the last properly working configuration. This fact makes the job of the network administrator much faster and reduces the time required to resolve human errors. Roaming is typically an enterprise grade capability that allows Wi-Fi clients, e.g. smartphones, laptops, tablets, to remain connected to the Wi-Fi network even if moving across the nodes (e.g. Access Points) of the same network. Such feature requires all nodes to agree on the messages exchanged in order to guarantee that the Wi-Fi client is always connected to one and only one node.

It is a first object of the invention to provide an alternative solution for remote management of nodes.

It is a further object of the invention to provide a solution for remote management of nodes with enhanced performances.

It is a further object of the invention to provide a solution for remote management of nodes, which enables to provide a uniform set of features among the nodes.

It is another object of the invention to provide a solution for remote management of nodes that enables full exploitation of the remote and centralized management potential.

It is another object of the invention to provide a solution for remote management of nodes that enables to upgrade the original feature set of the nodes.

The Applicant found that the above objects are achieved by a method and system according to claims 1 and 12, respectively.

In a first aspect, the present invention thus relates to a method of remote management in a network, the network comprising a plurality of nodes to be managed by a remote controller, the nodes being identified each by at least one characterizing parameter corresponding to any of predetermined instances of said at least one characterizing parameter, said at least one characterizing parameter being selected from the group consisting of: vendor, model, hardware version, firmware version, chipset type, wherein:
  the remote controller identifies the nodes, including identification of said at least one characterizing parameter;
  the remote controller accesses a database comprising said predetermined instances of said at least one characterizing parameter associated with respective upgrade procedures and controller firmwares, specifically configured for each instance of said at least one characterizing parameters, the controller firmwares implementing a uniform set of features among the nodes and enabling the nodes to be managed by the remote controller by means of a uniform set of managing procedures;
  for each identified node, the remote controller retrieves from said database the specific upgrade procedure and the specific controller firmware, which are associated in said database with the instance corresponding to said at least one characterizing parameter identified for the node;
  the remote controller executes, for each identified node, the retrieved specific upgrade procedure for loading the retrieved specific controller firmware onto the node;
  after loading the specific controller firmware, the remote controller manages the nodes according to said uniform set of features and by using said uniform set of managing procedures.

In a second aspect, the present invention relates to a system comprising a remote controller, a database and a network, the network comprising a plurality of nodes to be managed by the remote controller, the nodes being identified each by at least one characterizing parameter corresponding to any of predetermined instances of said at least one characterizing parameter, said at least one characterizing parameter being selected from the group consisting of: vendor, model, hardware version, firmware version, chipset type, wherein:
  the database stores a uniform set of managing procedures, which are uniform among the nodes;
  the database stores said predetermined instances of said at least one characterizing parameter in association with respective upgrade procedures and controller firmwares, specifically configured for each instance of said at least one characterizing parameters, the controller firmwares implementing a uniform set of features among the nodes and enabling the nodes to be managed by the remote controller by means of said uniform set of managing procedures;
  the remote controller is configured to:
    identify the nodes, including identification of said at least one characterizing parameter;
    retrieve from said database, for each identified node, the specific upgrade procedure and the specific controller firmware, which are associated in said database with the instance corresponding to said at least one characterizing parameter identified for the node;
    execute, for each identified node, the retrieved specific upgrade procedure for loading the retrieved specific controller firmware onto the node;
    after the specific controller firmware is loaded onto each node, manage the nodes, according to said uniform set of features and by using said uniform set of managing procedures.

The above feature of having the remote controller executing an identification step of the nodes allows to centrally make—on the remote controller side, in a seamless and automatic way—the identification of the nodes, eliminating the need of having each single node of the network pre-designed to be identified by the remote controller. This advantageously enables to seamlessly and automatically use, in the network, nodes of multiple and/or generic vendors/models/hardware versions/firmware versions/chipset types, without the need of having each single node of the network pre-designed or adapted (by modifying the firmware with one-by-one operations) to use a proprietary protocol which enables them to make initial contact with the remote controller, to be authenticated and to establish a connection with it, and to be identified by the remote controller, when the node is inserted into the managed network the first time.

Furthermore, having the remote controller retrieving a specific upgrade procedure and a specific controller firmware for each identified node, and executing the specific upgrade procedure for loading the specific controller firmware onto each node, advantageously allows to seamlessly and automatically enable the nodes of the network to be remotely and centrally managed by the remote controller, according to a uniform set of features and a uniform set of managing procedures, which are uniform among the nodes.

Indeed, the nodes have each a specific stock firmware loaded onto them, implementing a stock set of features and requiring specific managing procedures. The nodes are upgraded by the remote controller by means of specific upgrade procedures and specific controller firmwares, which are specifically designed for each node, based on the characterizing parameters of the node. When the retrieved specific controller firmwares are loaded onto the nodes, the stock firmwares are replaced by the respective controller firmwares that make the nodes to implement said uniform set of features and to be manageable by means of said uniform set of managing procedures, which are the same for all nodes.

Accordingly, the above combination of features advantageously enable, as a whole, the remote controller to handle nodes of multiple and/or generic vendors/models/hardware versions/firmware versions/chipset types as such (without requiring any one-by-one modification/adjustment operation), and to upgrade them, in a seamless and automatic way, to be remotely and centrally managed according to a set of features, which is uniform among the nodes nodes, fully manageable from one single remote controller, and which preferably extends (with advanced features) the stock feature set offered by each node.

In a third aspect, the present invention relates to a computer program adapted to carry out the steps concerning the remote controller in the method according to the invention.

In a fourth aspect, the present invention relates to a computer program adapted to carry out the steps concerning an agent device in the method according to the invention.

In a further aspect, the present invention relates to a computer program product comprising program code means stored on a computer readable medium for carrying out the steps concerning the remote controller in the method of the invention.

In a further aspect, the present invention relates to a computer program product comprising program code means stored on a computer readable medium for carrying out the steps concerning the agent device in the method of the invention.

In a further aspect, the present invention relates to a remote controller comprising hardware and/or software and/or firmware means adapted to carry out the steps concerning the remote controller in the method of the invention.

In a further aspect, the present invention relates to an agent device comprising hardware and/or software and/or firmware means adapted to carry out the steps concerning the agent device in the method of the invention.

In the present description and claims, the term:

"network" is used to indicate any wide or local area network, wired, wireless, hybrid wired/wireless;

"network device" is used to indicate any device of a network such as a router, a gateway, an access point, a server, a client device (such as a PC, tablet, laptop, mobile phone, and similar);

"node" is used to indicate a network device to be managed by a remote controller. Examples of nodes are routers, access points, gateways, firewalls, and network hard drives;

"feature" in relation to a network device or node, is used to indicate a capability or functionality of the network device/node.

In addition, the characterizing parameter "vendor" indicates vendor and/or manufacturer.

The present invention, in at least one of the above aspects, can exhibit at least one of the following preferred features.

Suitably, each node initially has a specific stock firmware (of a specific firmware version) loaded onto it, implementing a specific stock set of features and requiring the use by the remote controller of specific managing procedures (including said specific upgrade procedure. The loading of the retrieved specific controller firmware onto each identified node is preferably executed so as to replace the specific stock firmware with the specific controller firmware, which makes the node to implement said uniform set of features, instead of said specific stock set of features, and enables the remote controller to manage the node by using said uniform set of managing procedures, instead of using said node-specific managing procedures.

In a preferred embodiment, in said database, said predetermined instances of said at least one characterizing parameter are associated with respective configuration extraction procedures, specifically configured for each instance of said at least one characterizing parameters. Preferably, for each identified node, the remote controller retrieves from said database the specific configuration extraction procedure which is associated in said database with the instance corresponding to said at least one characterizing parameter identified for the node; and, before executing the retrieved specific upgrade procedure onto the identified node, the remote controller executes the retrieved specific configuration extraction procedure onto the identified node for extracting its current configuration. Then, the remote controller preferably saves the extracted current configuration of the identified node into the database.

In a preferred embodiment, before executing the retrieved specific upgrade procedure onto each identified node, the remote controller modifies the retrieved specific controller firmware by updating its default configuration so as to conform at least in part to said extracted current configuration. Preferably, said default configuration is updated at least as far as concerns Internet connection parameters, enabling the identified node to access the Internet. For example, in an IP based network, the default configuration for a node connected in a LAN with Static IP addressing can be updated adding just the IP parameters, Subnetmask, Gateway and DNS (Domain Name System).

Preferably, after executing the retrieved specific upgrade procedure onto each identified node, the remote controller sends the extracted current configuration to the node.

In a preferred embodiment, when the specific controller firmware cannot be directly loaded onto the identified node (e.g. due to a limited size of the flash memory and/or unsuitable boot loader type of the node), the remote controller loads at least one specific bridge firmware onto the identified node, before loading the specific controller firmware. Preferably, said at least one specific bridge firmware is suitably configured to restructure the flash memory and/or change the boot loader of the node in such a way that the specific controller firmware can be properly loaded onto it. Preferably, said at least one specific bridge firmware is associated in said database with the instance corresponding to said at least one characterizing parameter identified for the node.

Preferably, the database is associated with or housed into the remote controller.

The remote controller may identify the nodes by retrieving the characterizing parameter from the database (e.g. wherein they can be pre-stored by a network administrator), or by obtaining them as input parameters (e.g. from the network administrator). In a preferred embodiment, the remote controller identifies the nodes by obtaining the characterizing parameter directly from the nodes. Preferably, the database comprises a plurality of identification procedures for identifying the nodes and obtaining from them said at least one characterizing parameter. Preferably, the remote controller executes in sequence at least part of said plurality of identification procedures till it successfully identifies the node obtaining from it said at least one characterizing parameter. Preferably, the identification procedures are executed in sequence according to a predetermined selection criterion. Preferably, said identification procedures are specifically configured to respectively work on said predetermined instances of said at least one characterizing parameter.

Preferably, the remote controller identifies the nodes in the application layer (layer 7) of the Open Systems Interconnection (OSI) model.

In a preferred embodiment, the remote controller executes a discovery procedure for discovering the plurality of nodes, including the node identifiers as, for example, the IP addresses and/or MAC addresses. Preferably, the discovery procedure includes trying to reach (e.g. by sending a discovery message) the plurality of nodes by using a predetermined IP address and/or MAC address, or by using a scanning procedure scanning a predetermined multitude of IP addresses. A node is discovered when it has been successfully reached (e.g. when it replies to the discovery message sent by the remote controller).

In a preferred embodiment, the predetermined multitude of IP addresses comprises IP addresses included in at least one subnet corresponding to at least one interface of the remote controller, and/or generic IP addresses corresponding to IP addresses set by default by predetermined vendors.

When the remote controller comprises more than one interface, the scanning procedure is preferably executed for each interface.

Preferably, the remote controller executes the identification of the nodes on the discovered nodes.

Preferably, the database comprises a section for storing the node identifiers associated with their corresponding characterizing parameters. Preferably, for each identified node, the remote controller saves into the database the obtained at least one characterizing parameter in association with the node identifier, as previously discovered during execution of the discovery procedure, so as to fill said section of the database Preferably, the discovery procedure is carried out in the network layer (layer 3) or data link layer (layer 2) of the OSI model.

The nodes of the network may be generic nodes (i.e. from any vendor/model/hardware version/firmware version/chipset type). At least two of the nodes may differ from each other for said at least one characterizing parameter.

In a preferred embodiment, when a connection to a specific node with a specified IP address and MAC address has to be established, and in case of IP address conflict between the specific node and at least one other node of the plurality of nodes, the remote controller executes an IP conflict avoidance procedure making use of ARP protocol and ARP table, the IP conflict avoidance procedure comprising:
i. sending into the network a request according to ARP protocol in order to translate the specified IP address into a MAC address;
ii. after executing i., checking if the ARP table includes the specified IP address;
iii. in the positive case of ii., checking if the specified IP address is associated in the ARP table with the specified MAC address;
iv. in the positive case of iii., trying to reach the specific node by using the specified IP address;
v. in the negative case of iii., modifying the ARP table so as to associate the specified IP address with the specified MAC address, then trying to reach the specific node by using the specified IP address.

In a preferred embodiment, when a connection to a specified IP address through a specified interface of the remote controller has to be established, and in case of IP address conflict between the specified IP address and the IP address of the specified interface and/or in case the specified IP address is not included in a subnet corresponding to the specified interface, the remote controller executes a subnet conflict avoidance procedure comprising:
I. checking if the specified IP address is included in the subnet corresponding to the specified interface and if the specified IP address is different from the IP address of the specified interface,
II. in the affirmative case of I., the remote controller tries to establish a connection by using the specified IP address,
III. in the negative case of I., the remote controller temporally assigns to the specified interface both a subnet including the specified IP address and an IP address included is said subnet, which is different from the specified IP address.

Advantageously, when the remote controller comprises a plurality of interfaces, step III also comprises a step of temporarily making out of use any other interface of the plurality of interfaces, other than the specified interface, which corresponds to a subnet including the specified IP address.

Suitably, the network is a communication network, preferably a telecommunication network.

In a preferred embodiment, the nodes are in a Local Area Network (LAN) of the network. The remote controller may be in the LAN or outside the LAN (e.g. in a Wide Area Network or WAN). When the remote controller is outside the LAN, the LAN preferably comprises at least one agent device. In this case, the remote controller preferably executes the identification, the specific upgrade procedure (and preferably the discovery procedure and/or the configuration extraction procedure and/or the IP conflict avoidance procedure) through intermediation of the at least one agent device.

The procedures executed by the remote controller through intermediation of the agent device comprise: the case wherein the remote controller only drives the agent device, which is configured to actually execute the actions; the case wherein the remote controller actually executes the actions, the agent device merely acting as a router for delivering messages/commands to/from the nodes; and a mixed case (e.g. wherein some actions are actually executed by the remote controller while some other actions are actually executed by the agent device).

Preferably, before executing the procedures, initial contact is established between the at least one agent device and the remote controller in order to establish a connection between the at least one agent device and the remote controller.

During the initial contact between the at least one agent device and the remote controller, the at least one agent device is preferably authenticated by the remote controller and/or vice versa.

After the specific controller firmware is loaded onto each node, the remote controller preferably directly manages the nodes, without intermediation of the at least one agent device.

Preferably, the connection established between the at least one agent device and the remote controller is a tunnel connection.

In a preferred embodiment, the tunnel connection is established by the at least one agent device according to a tunnelling procedure including the step of trying in sequence a predetermined plurality of tunnelling protocols for establishing tunnel connection with the remote controller till a tunnel connection is successfully established.

In an embodiment, the predetermined plurality of tunnelling protocols are tried in sequence following a selection criterion adapted to minimize resources required on the at least one agent device and/or on the remote controller in order to execute the tunnelling protocols.

Preferably, in the system, said predetermined instances of said at least one characterizing parameter are associated in said database with specific configuration extraction procedures, and, for each identified node, the remote controller is configured to:
  retrieve from said database the specific configuration extraction procedure which is associated in said database with the instance corresponding to said at least one characterizing parameter identified for the node; and
  before executing the retrieved specific upgrade procedure onto the identified node, execute the retrieved specific configuration extraction procedure onto the identified node for extracting its current configuration.

Preferably, in the system, each of at least part of said predetermined instances of said at least one characterizing parameter is associated in said database with at least one specific bridge firmware, and the remote controller is configured to:
  retrieve from said database the at least one specific bridge firmware which is associated in said database with the instance corresponding to the at least one characterizing parameter identified for the node; and
  before loading the retrieved specific controller firmware onto the identified node, load said at least one specific bridge firmware onto the identified node, said at least one specific bridge firmware being suitably configured to restructure the flash memory and/or change the boot loader of the identified node in such a way that the specific controller firmware can be properly loaded onto it.

Further characteristics and advantages of the present invention will become clearer from the following detailed description of some preferred embodiments thereof, made as an example and not for limiting purposes with reference to the attached drawings. In such drawings, FIG. 1 schematically shows a system according to an embodiment of the invention;

FIG. 2 schematically shows an algorithm to implement a management method according to a preferred embodiment of the invention;

FIG. 3 schematically shows a remote controller according to an embodiment of the invention;

FIG. 4 schematically show the structure of a remote controller database according to an embodiment of the invention;

FIGS. 5A, 5B and 5C schematically show the structure of three sections of the remote controller database of FIG. 4;

FIG. 6 schematically shows an agent device according to an embodiment of the invention;

Figure 1:
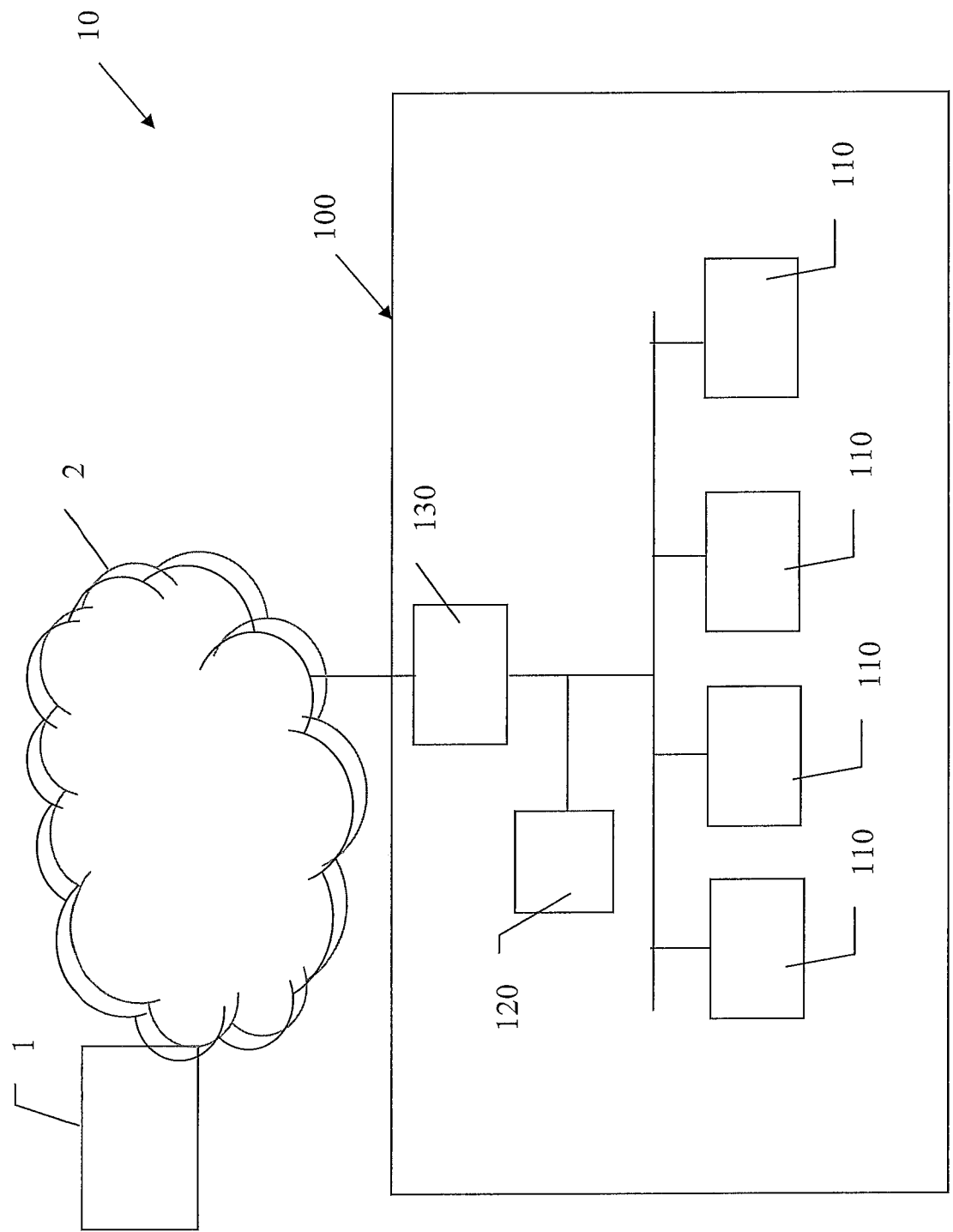

FIG. 1 shows a managing system 10 according to an embodiment of the invention, comprising a remote controller 1, a WAN 2 and a LAN 100. In the exemplary embodiment, the remote controller 1 is located in the WAN 2, the WAN 2 comprises the Internet, and the LAN 100 comprises a plurality of network devices 110, 120 and 130.

In a preferred embodiment of the invention, LAN 100 is an Ethernet/IP (Internet Protocol) LAN. That is, LAN 100 can have any physical layer, and has an Ethernet layer 2 (or data link layer) and an IP layer 3 (or network layer). In addition, the LAN 100 can have a layer 7 (or application layer) based, for example, on HTTP, HTTPS, SSH, SNMP or any other application layer protocol.

In the present disclosure, reference to layer 2 (or data link layer), layer 3 (or network layer) and layer 7 (or application layer) is made according to OSI model well known in the art.

Preferably, LAN 100 supports translation protocols for resolution of layer 3 addresses (e.g. IP addresses) into layer 2 addresses (e.g. Media Access Control or MAC addresses) and vice-versa. Examples of these protocols respectively are ARP (Address Resolution Protocol) and RARP (Reverse Address Resolution Protocol) well known in the art and specified, for example, by RFC 826 and RFC 903.

Network devices 110, 120 and 130 can be wireless or wired routers, access points (AP), gateways, firewalls, network hard drives, local servers, client devices (such as PC, tablet, laptop, mobile phone, . . . ) and similar.

Network devices 110, 120 and 130 comprise nodes 110 to be managed by remote controller 1. The nodes 110 can be any network device that might require being configured or managed such as, for example, routers, access points (AP), gateways, firewalls, network hard drives.

As explained more in detail below, thanks to the invention, the nodes 110 to be managed by remote controller 1 can be of multiple and/or generic vendors, models, hardware versions, firmware versions, chipset types. In addition, they can be identified by any class or range of (MAC) addresses. The nodes have each a specific stock firmware, of a specific version, that may vary depending on the specific vendor, model, hardware version and chipset type.

The model indicates a particular type or version of a node of a vendor. A specific model of a vendor may be associated with multiple hardware versions and/or firmware versions.

In the example of FIG. 1, LAN 100 comprises gateway (GW) 130 for connection to the Internet of WAN 2, agent device 120, and four nodes 110 to be managed.

The agent device 120 is an intermediate component of the system 10 that allows the remote controller 1 located in the WAN 2 to communicate with any node of the managed LAN 100, at least in an initial phase of the management method of the present disclosure.

In particular, the agent device 120 can be any network device of the LAN 100 wherein an agent utility (i.e. computer program) is deployed, which is adapted to carry out the steps of the management method of the present disclosure relating to the agent device. The network device wherein the agent utility is deployed can be a local server of the LAN, which is an always-running device. However, it can also be a client device or a node.

The agent utility is a software and/or firmware that can be installed onto a local server of the LAN 100, but can also be represented by a temporary running software on a client device inside the LAN 100, e.g. an active-x or a browser add-on which is active only when the user turns-on a suitable interface of the client device, such as a web-site on his/her laptop, PC, smartphone/tablet or similar device.

The agent device 120 can comprise one or more interfaces, each covering a subnet of nodes 110 of LAN 100. Each interface is advantageously identified by a specific interface identifier (e.g.: interface 1, interface 2, ... interface n) and each subnet is identified by an identifier representing a part of IP address (usually the head portion of the IP address) which should be shared among all nodes 110 belonging to the subnet. For example, considering a 32-bit IP address made of 4 sections A.B.C.D, the subnet identifier may represent the initial section(s) A, A.B, or A.B.C. or an intermediate section (e.g. B or B.C).

Even if in the embodiment of FIG. 1 the LAN 100 comprises a single agent device 120, each LAN can comprise more than one agent device.

The agent device 120 is configured to connect to the remote controller 1.

The remote controller 1 is the network element through which the user(s) (e.g. network administrator(s)) can reach all the nodes 110 to be managed (e.g. configured and/or monitored). The remote controller 1 can be controlled by a private company/service provider. In the embodiment of FIG. 1, remote controller 1 is a centralized server available in Internet. However, the remote controller 1 can also be located in a public cloud, in an intranet, in a private cloud, or even in the LAN 100 for scalability or security reasons (e.g. in order to meet specific network security policies specified by the network administrator). In case the remote controller 1 is located in the LAN 100, the presence of the agent device 120 may be eliminated.

The term "remote controller" is used to indicate a centralized remote host or a software/firmware utility (i.e. computer program) deployed on a centralized remote host. The term "remote" indicates that the controller 1 is separate and remote from the nodes to be managed (optionally, with the exception for the node where it might be deployed when located in the LAN).

The remote controller 1 and the agent device 120 comprise each hardware and/or software and/or firmware modules adapted to implement the corresponding steps of the management method according to the present disclosure.

On the other side, nodes 110 need no to be pre-designed or pre-adapted (e.g. to support specific protocols usually implemented within the specific firmware to be used by the remote controller) in order to enable them to implement the management method according to the present disclosure. Indeed, as shown in more detail hereinafter, a crucial innovation of the present disclosure is the fact that the remote controller 1 is enabled to handle nodes of multiple/generic vendors/models/hardware versions/firmware versions/chipset types as such (without requiring any one-by-one modification/adjustment operation), and to seamlessly and automatically upgrade them to be remotely and centrally managed according to a set of features, which is uniform among the nodes, fully manageable from one single remote controller, and which preferably extends (with advanced features) the original feature set offered by each node.

Figure 3:
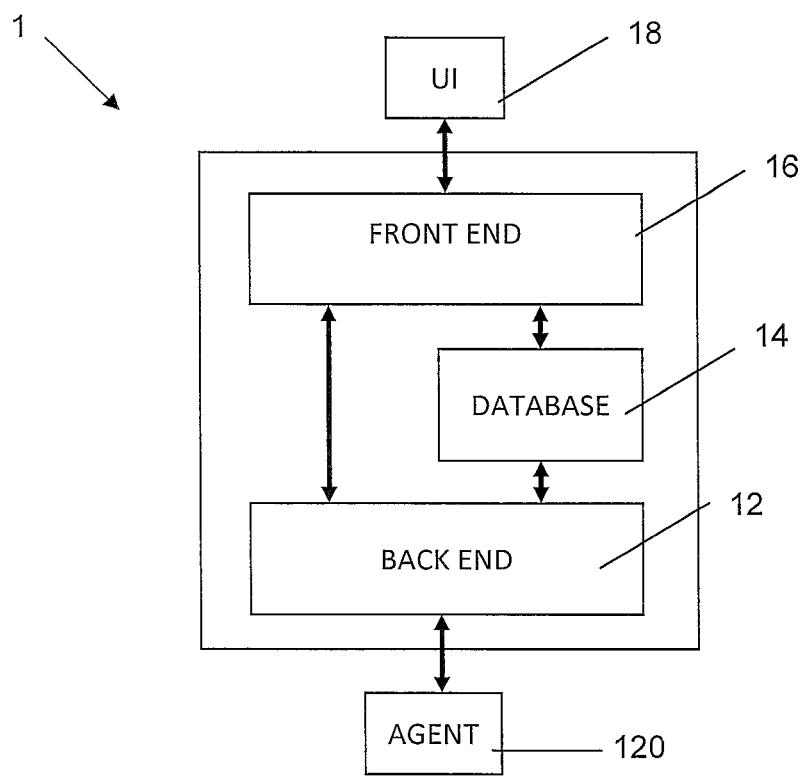

In order to implement the management method of the present disclosure, the remote controller 1 preferably comprises three logical sub-components, shown in FIG. 3: a database 14; a back-end 12; and a front-end 16.

A user, herein after referred to as network administrator, can interact with the remote controller 1 in order to access, configure, control and monitor the nodes 110 through at least one user interface UI 18. User interfaces 18 can be command line interfaces, desktop applications, web applications, mobile devices applications such as iPad, iPhone or Android applications, widgets, and similar. The at least one user interface UI 18 is adapted to exchange information with the front-end 16.

The database 14, back-end 12, and front-end 16 can be physically deployed on a same server, as reported in FIG. 3, or on different servers or virtual servers or clouds, private or public.

The front-end 16 allows, through user interface UI 18, the network administrator to choose which nodes 110 to access, configure, control and monitor.

The back-end 12 is the sub-component of the remote controller 1 that allows establishing communication between the remote controller 1 and the agent device 120.

Figure 4:
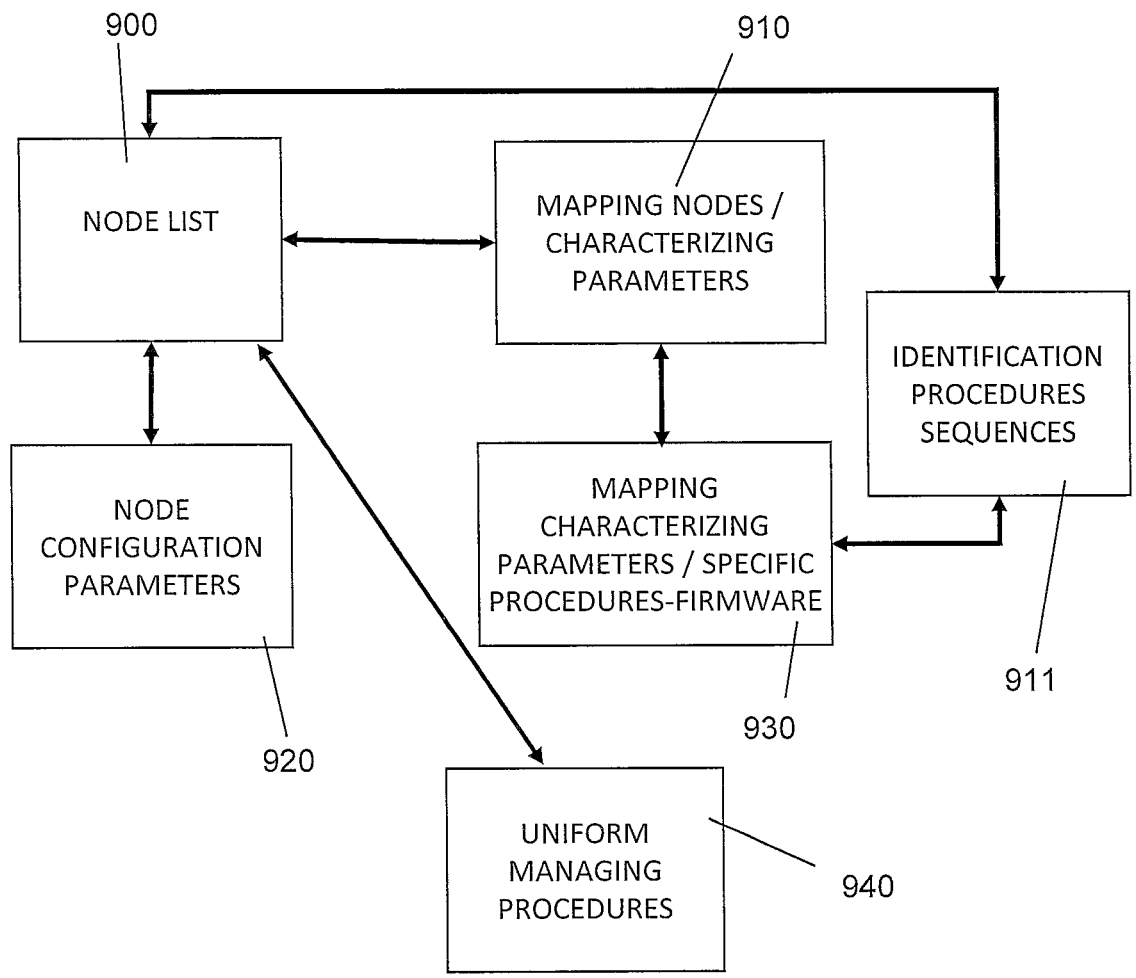
Figure 14:
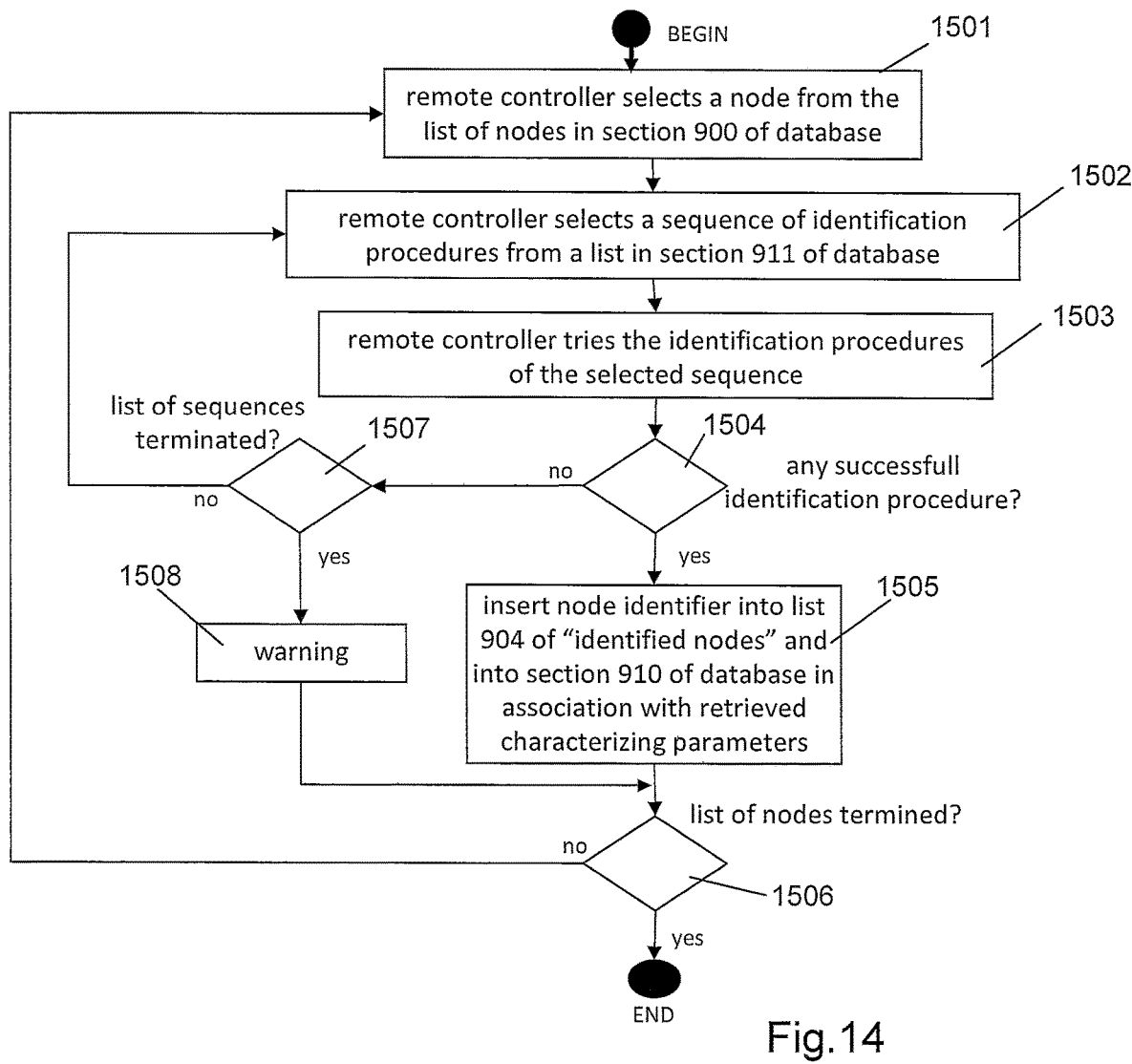
FIG. 14 shows a flowchart of an algorithm to implement an identification procedure according to a preferred embodiment of the invention.

FIG. 4 schematically shows the structure of database 14 according to a preferred embodiment of the invention, wherein the database 14 comprises: a first section 900 for containing a list of nodes, identified, for example, by IP and/or MAC addresses; a second section 910 wherein the nodes of the list (identified by their IP and/or MAC addresses) can be associated with their corresponding characterizing parameters such as model, vendor, manufacturer, hardware version, firmware version and/or chipset type; a third section 920 wherein the nodes of the list are associated with specific configuration parameters that can be specified by the network administrator; a fourth section 930 comprising multiple instances of characterizing parameters associated with corresponding, specifically designed procedures and firmwares; a fifth section 940 comprising a centralized set of managing procedures, which is uniform among the nodes 110; and a sixth section 911 comprising a list of sequences of identification procedures, as explained further in detail herein after, when dealing with nodes identification of FIG. 14.

As explained in more detail below, the content of first section 900 and second section 910 is not known a priori but it is respectively filled and updated during execution of node discovery procedure and node identification process of the managing method of the present disclosure. On the other side, the content of sections 911, 930 and 940 is known a priori and filled before execution of the managing method, while the content of section 920 can be filled any time by the network administrator, whenever it is necessary to set/change/modify/add/remove specific configuration parameters. For example, the content of sections 911 and 930 can be pre-defined thanks to specific agreement with the specific vendors.

Figure 5:
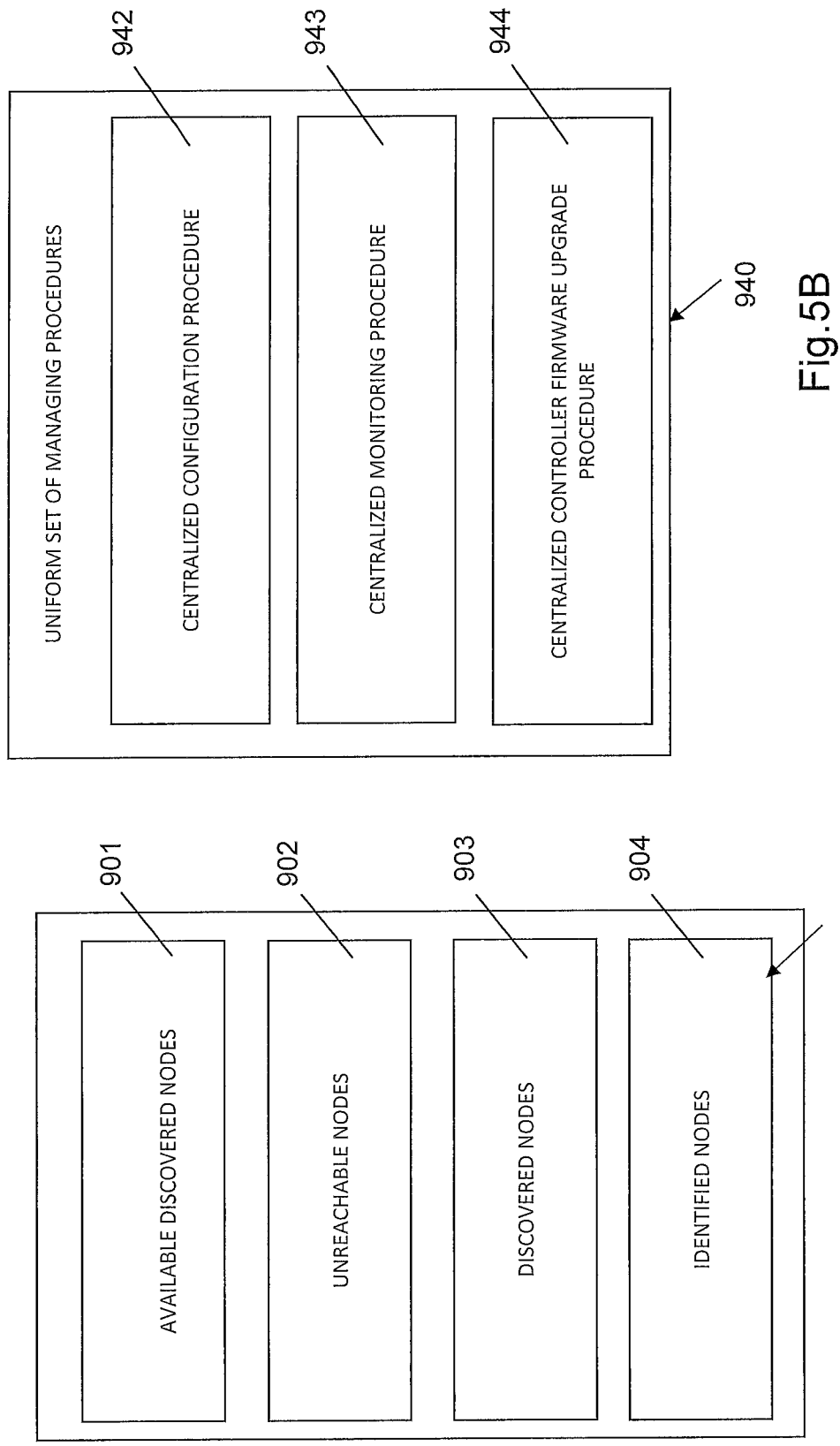

As schematically shown in FIG. 5A, in first section 900 nodes can be classified (as explained in more detail below) in "available discovered nodes" 901, "unreachable nodes" 902, "discovered nodes" 903 and "identified nodes" 904.

As shown in FIG. 5B, the fifth section 940 comprises the centralized uniform set of managing procedures, which are the same for all nodes 110. For example, the uniform set of managing procedures can comprise a single, centralized configuration procedure 942, a single, centralized monitoring procedure 943 and a single, centralized controller-firmware upgrade procedure 944. The managing procedures 942, 943, 944 can be implemented according to protocols and mechanisms well known in the art as, for example in layer 7: CLI (Command Line Interface), SSH (Secure SHell, as for example defined by RFC4251), Telnet protocol, HTTP (Hyper Text Transfer Protocol, as for example defined by RFC2616), HTTPS (Hyper Text Transfer Protocol over Secure Socket Layer, as for example defined by RFC2818), SMTP (Simple Network Management Protocol, as for example defined by RFC1157), OPC (Open Connectivity as described for example at the web site opcfoundation.org) protocol, SCADA (Supervisory Control And Data Acquisition) architecture, mechanism to download configuration file(s) from a node and to upload into the node new configuration file(s) with modified parameters, such as FTP (File Transfer Protocol, as for example defined by RFC959), TFTP (Trivial File Transfer Protocol, as for example defined by RFC1350), SCP (Secure Copy Protocol); custom and proprietary protocols designed from scratch, eventually including known protocols as sub components.

As shown in FIG. 5C, in fourth section 930 instances of characterizing parameters (in the example, instances of the term vendor, model and firmware version) are associated with corresponding, instance-specific procedures and firmware. In particular, each instance of characterizing parameters (vendor, model and firmware version) is associated with corresponding configuration extraction procedure (e.g. configuration extraction procedure A, B, C, D, E or F), upgrade procedure (e.g. upgrade procedure A, B, C, D, E or F) and controller firmware (e.g. controller firmware A, B, C, D, E or F), which are specific for said instance of characterizing parameters. For example, in the embodiment of FIG. 5C, the instance "vendor xx1, model yy1, firmware version zz1" is associated with configuration extraction procedure A, upgrade procedure A and controller firmware A; while the instance "vendor xx1, model yy1, firmware version zz2" is associated with configuration extraction procedure B, upgrade procedure B and controller firmware A. For example, as stated above, this information can be obtained thanks to specific agreement with the specific vendors.

Sixth section 911 preferably contains instance-specific identification procedures, which are specifically configured to identify nodes having characterizing parameters corresponding to the instances of characterizing parameters contained in fourth section 930. As stated above, this information can for example be obtained thanks to specific agreement with the specific vendors.

In fourth section 930, the controller firmwares are designed taking into account the specific characterizing parameters of each instance and, in particular, of each term vendor-model-chipset type, so as to provide all nodes 110 with a same uniform set of features and to make all nodes 110 manageable by the remote controller 1 by means of the uniform set of managing procedures stored in section 940.

In fourth section 930 and sixth section 911, the above mentioned instance-specific procedures (identification, configuration extraction procedures and upgrade procedures) are designed by taking into account the specific characterizing parameters of each instance and, in particular, the stock firmware version of each instance, and by using protocols and/or mechanisms supported by said stock firmware version.

Examples of such protocols and mechanisms well known in the art in the layer 7 are the following: CLI (Command Line Interface), SSH (Secure SHell, as for example defined by RFC4251), Telnet protocol, HTTP (Hyper Text Transfer Protocol, as for example defined by RFC2616), HTTPS (Hyper Text Transfer Protocol over Secure Socket Layer, as for example defined by RFC2818), SMTP (Simple Network Management Protocol, as for example defined by RFC1157), OPC (Open Connectivity as described for example at the web site opcfoundation.org) protocol, SCADA (Supervisory Control And Data Acquisition) architecture, mechanism to download configuration file(s) from a node and to upload into the node new configuration file(s) with modified parameters, such as FTP (File Transfer Protocol, as for example defined by RFC959), TFTP (Trivial File Transfer Protocol, as for example defined by RFC1350), SCP (Secure Copy Protocol); mechanism that mocks the navigation of a virtual user through the web-based interface of a node, emulating navigation commands, such as HTTP-based queries, HTTPS-based queries, AJAX (Asynchronous JavaScript and XML) interactions.

As explained in more detail below, the identification procedures are specifically designed in order to enable (in layer 7) the remote controller 1 to connect to the nodes 110, to perform authentication and to obtain directly from them their characterizing parameters; the configuration extraction procedures are specifically designed in order to enable (in layer 7) the remote controller 1 to access the nodes 110 and to extract the current configuration of the nodes 110; the upgrade procedures are specifically designed in order to enable (in layer 7) the remote controller 1 to load the specific controller firmware onto the nodes 110, by replacing the stock firmware originally deployed onto the nodes 110.

Figure 6:
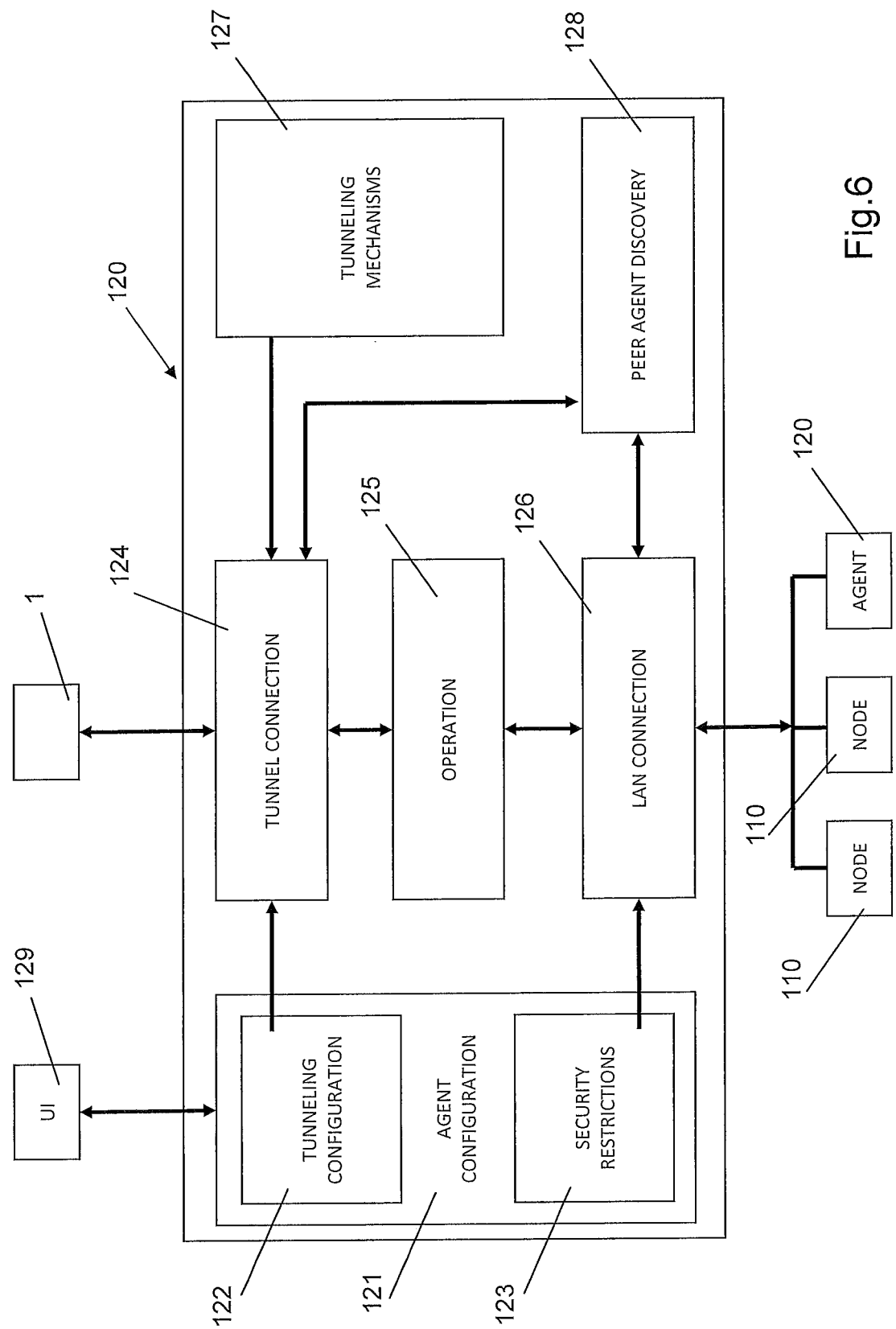

It is noted that even if the instance-specific procedures (e.g. identification procedures, configuration extraction procedures and upgrade procedures) and the centralized uniform set of managing procedures (e.g. centralized configuration procedure 942, centralized monitoring procedure 943 and centralized controller-firmware upgrade procedure 944) may be implemented using the same data link layer (e.g. Ethernet layer 2) and the same network layer (e.g. IP layer 3) and using—at least in part—similar protocols and mechanisms in the application layer 7, the main difference between the instance-specific procedures and the centralized uniform set of managing procedures is that the former are instance-specific, that is they vary depending on the specific characterizing parameters of the nodes 110, while the latter are the same for all nodes 110, irrespectively of their specific characterizing parameters, so that the nodes 110 can be uniformly managed by the remote controller 1, notwithstanding the nodes 100 are of multiple and/or generic vendors, models, hardware versions, firmware versions, chipset types. In order to implement the management method of the present disclosure, the agent device 120 preferably comprises a user interface 129, an agent configuration section 121, a tunneling connection section 124, an operation section 125, a LAN connection section 126, a tunneling mechanism section 127, a peer agent discovery section 128, as shown in FIG. 6.

The agent configuration section 121, in its turn, comprises a tunneling configuration section 122 and a security restrictions section 123.

The tunneling configuration section 122 advantageously comprises parameters required by specific tunneling mechanisms (such as, for example, remote controller address, proxy authentication parameters, etc.) or administrative exclusion of specific tunneling mechanisms (e.g. for security reasons).

The security restrictions section 123 allows the network administrator to deny access to specific nodes 110 and to be compliant with strict security policies. If these restrictions are specified, both agent device 120 and remote controller 1 will not be able to reach the restricted nodes 110.

The tunnel connection section 124 is adapted, in cooperation with tunneling mechanism section 127, to establish a tunnel connection with the remote controller 1 by taking the appropriate actions to overcome a variety of network obstacles that can prevent the agent device 120 to successfully connect to the remote controller 1, as explained in more detail herein after with reference to FIG. 7. Said obstacles can include NAT translators, firewalls, proxies, traffic-shapers and similar.

The operation section 125 is adapted to enable execution of operations under the control of the remote controller 1, such as, for example, execution of configuration extraction procedures A-F, upgrade procedures A-F, tunneling procedure, discovery procedure, identification procedures, IP conflict avoidance procedure, subnet conflict avoidance procedure, described in detail herein after.

The LAN connection section 126 is adapted to establish LAN connections with the nodes 110 according to techniques known in the art, such as for example Ethernet (IEEE 802.3), WiFi (IEEE 802.11), Fiber Optic or other network standards.

The tunneling mechanism section 127 is adapted to execute a tunnelling procedure, as explained in more detail herein after with reference to FIG. 7.

The peer agent discovery section 128 is adapted to implement a peer discovery procedure in order to discover any other agent device that may be present in the LAN. This procedure is described in more detail below, with reference to FIG. 7.

The user interface 129 enables the network administrator to directly interact with the agent device 120.

In order to connect to the remote controller 1, the agent device 120 preferably establishes a tunnel connection using a variety of techniques to overcome possible network obstacles that include, but are not limited to, NAT translators, UDP blocks, firewalls, gateways, traffic shapers, http proxies, https proxies, socks proxies, and so on.

Tunneling techniques, e.g. UDP tunnel, known in the art are able to pass only a subset of said network obstacles (e.g. NAT translators). This requires the network administrator to modify the security policies of the LAN in order to guarantee the proper communication with the remote controller 1. Unfortunately, especially in large enterprises and corporations, it is not always possible to modify such policies.

The tunneling procedure according to a preferred embodiment of the invention aims at guaranteeing a tunnel connection irrespectively of any security policies configured in the LAN 100, without requiring any change of such security policies.

This is obtained thanks to a preferred tunneling procedure wherein the agent device 120 tries in sequence a plurality of tunnelling protocols for establishing a tunnel connection with the remote controller 1, till a tunnel connection is successfully established.

The plurality of tunnelling protocols tried by the agent device 120 can be, for example, the following protocols known in the art: ip-over-ip tunneling; ip-over-udp tunneling; ip-over-tcp tunneling; ip-over-http tunneling; ip-over-http tunneling through proxy (http, https, socks, etc.); http tunneling through proxy and traffic shaper.

Figure 7:
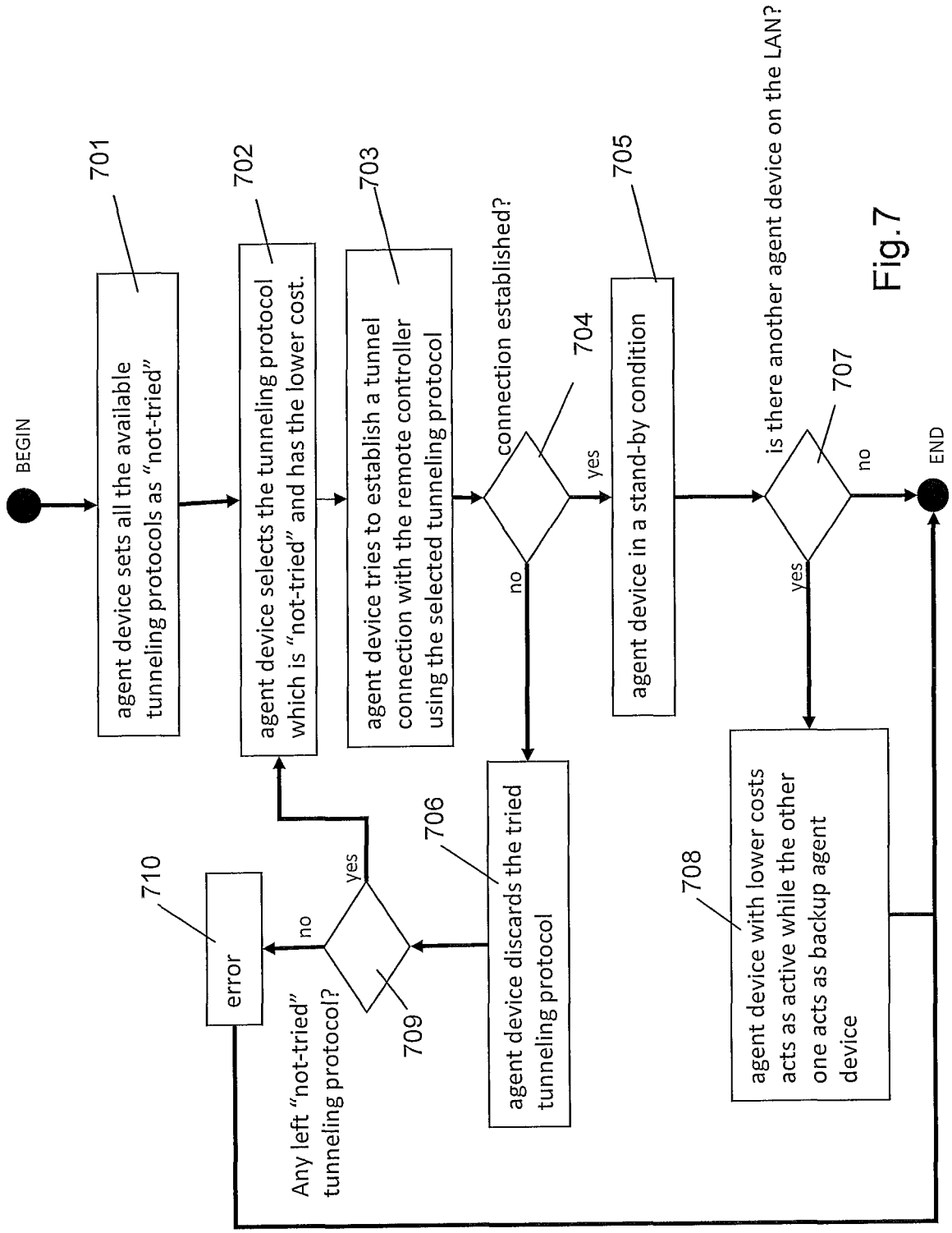
FIG. 7 shows a flowchart of an algorithm to implement a tunneling procedure according to an embodiment of the invention.

FIG. 7 shows an exemplary embodiment of algorithm to implement the tunneling procedure according to a preferred embodiment of the invention.

At block 701, the agent device 120 sets all the available tunneling protocols as "not-tried". Non configured protocols, i.e. the ones that require some configuration parameter to be specified by the network administrator (e.g. proxy address in case of http tunneling through proxy) are discarded. In addition, the network administrator could decide to exclude specific protocols from the list, in order to be compliant with predetermined security rules or policies. In this case, excluded protocols will not be tried.

At block 702, the agent device 120 selects the protocol having the lower cost among the ones labeled as "not-tried". As each protocol is able to pass different kind of network obstacles and has a specific cost in term of required resources both on the agent device and on the server or cloud platform where the remote controller 1 is executed, the cost can represent the required resources at the agent device 120 and/or remote controller 1. The required resources can include computational power, network bandwidth, power consumption, memory usage or any other aspect that can be relevant for the specific network.

The cost associated to each protocol can be assigned in a variety of ways. For example, it can be an arbitrary integer number (1: ip packets, 10: udp tunnel, 100: tcp tunnel, 1000: http tunnel, . . . ).

At block 703 the agent device tries to establish a tunnel connection with the remote controller 1 using the selected tunneling protocol.

At block 704, the agent device 120 checks if the connection is established.

In the positive case, at block 705 the agent device 120 stays in a stand-by condition, waiting for instructions from the remote controller 1 or nodes 110.

In the negative case, at block 706 the agent device 120 discards the tried protocol and at block 709 checks if there is any other tunneling protocol set as "not-tried". In the positive case, the agent device 120 returns to block 702 to try another—not yet tried-tunneling protocol at a higher cost. In the negative case, it means that the agent device 120 didn't find any suitable tunneling protocol and an error is returned at block 710.

In a preferred embodiment, the algorithm also comprises blocks 707 and 708. At block 707, once connected, the agent device 120 checks if there is any other agent device on the same LAN 100. In the negative case, the algorithm ends. In the positive case, at block 708 agent device 120 chooses to act as active agent or backup agent device based on a cost comparison: the agent device with the lower cost acts as active while the other one acts as backup agent device. One example of metric for cost comparison is the time availability of the agent device: this metric would allow the system to use agent devices that are resident on a local server and consider client activex or similar agents as backup.

Two exemplary strategies to allow the agent device 120 to discover the existence of concurrent agent devices on the same LAN are the following: centralized and peer-based. In the centralized strategy, the remote controller 1 compares the list of nodes 110, e.g. the MAC address, associated to each agent device 120; if two agent devices are associated to the same list of nodes 110, they are considered concurrent and the remote controller 1 decides which agent device 120 must act as backup. In the peer-based strategy each agent device 120 sends broadcast packets to establish a connection to other peer-agent devices 120 on the same LAN 100; these packets contain information about actual connectivity to remote controller 1 and cost; each agent device 120 can individually decide to act as backup or active agent for the LAN 100. Both of these solutions have strengths and weaknesses: the centralized approach simplifies the agent device structure and makes no assumption on agent intra-LAN connectivity but requires higher resources on the remote controller 1; the peer-based approach reduces the resources used by the remote controller 1, but requires a higher complexity on the agent devices 120.

According to the management method of the present disclosure, after the agent device 120 makes initial contact with the remote controller 1 by establishing a tunnel connection with remote controller 1, the remote controller 1 executes a discovery procedure through intermediation of the agent device 120 for discovering the nodes 110 of LAN 100 (that is, for ascertaining the presence of the nodes 110).

In particular, in the context of the present disclosure, wherein the nodes 110 to be managed by remote controller 1 are of multiple and/or generic vendors, models, hardware versions, firmware versions, chipset types and there may not be a priori knowledge of the node identifiers, as IP addresses and/or MAC addresses, the discovery procedure advantageously enables the remote controller 1 to ascertain the presence of the nodes 110, to discover (determine) their identifiers, to add the discovered identifiers into the list of nodes in first section 900 of database 14 and to preferably classify them into "available discovered nodes" 901, "unreachable nodes" 902 and "discovered nodes" 903.

In the discovery procedure the remote controller 1 tries to reach the nodes 110, via intermediation of the agent device 120, and checks if they are successfully reached. Preferably, the discovery procedure is executed in the communication layer 3 or layer 2. There is a variety of ways well known in the art the agent device 120 can use to reach a node in the communication layer 3 or layer 2 such as, for example, sending a discovery message (e.g. ping echo request in the Internet Control Message Protocol/ICMP) or creating a TCP (Transmission Control Protocol) socket to a specified IP address, according to techniques well known in the art. The node is successfully discovered when a response message (e.g. ping echo reply in the ICMP) is received by the node or the socket is successfully created.

The discovery procedure is executed by using a predetermined IP address and/or MAC address, or by using an automatic scanning procedure (not requiring any information from the network administrator), which scans a predetermined multitude of IP addresses for trying to establish a connection with the nodes 110.

Figure 8:
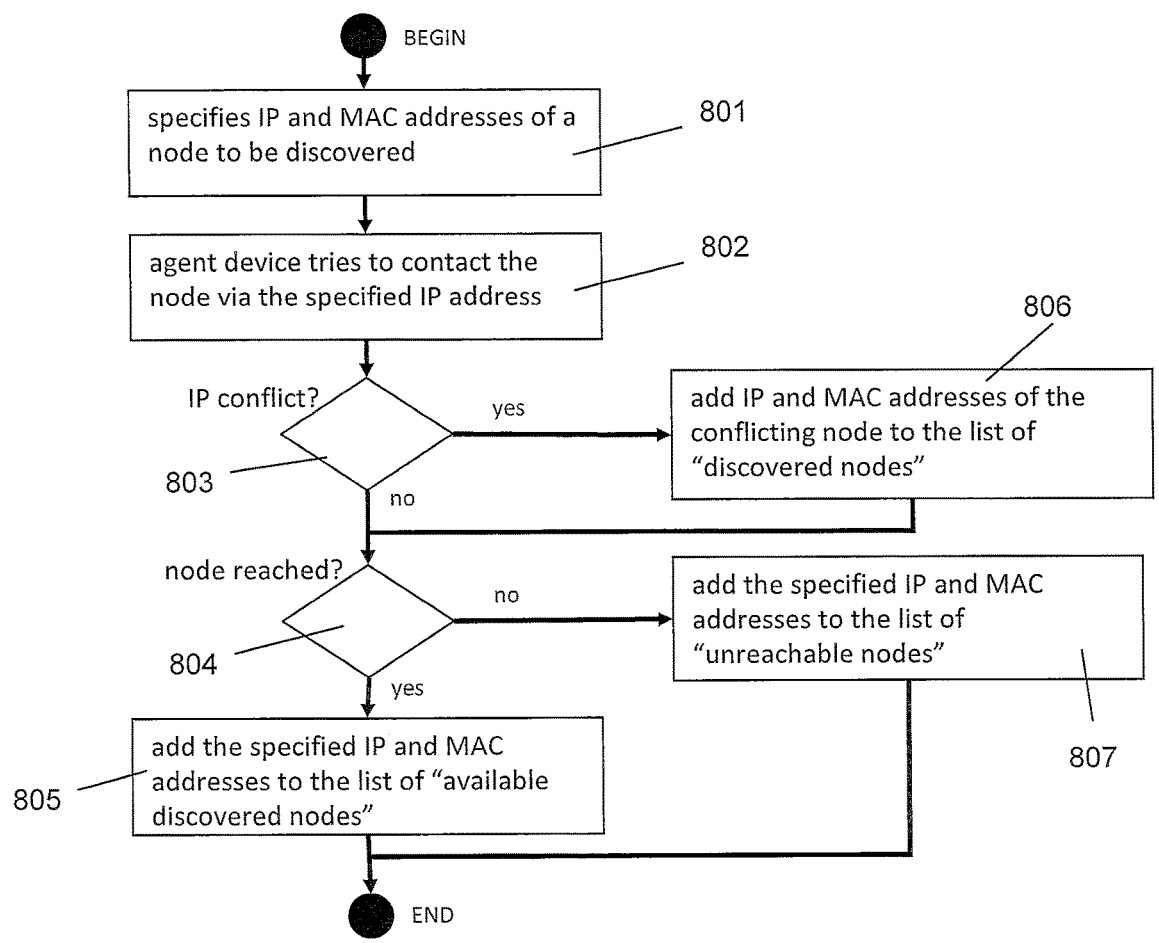
FIG. 8 shows a flowchart of an algorithm to implement a discovery procedure according to a first embodiment of the invention.

FIG. 8 shows a first embodiment of the discovery procedure, making use of both IP and MAC addresses.

At block 801 network administrator specifies to the remote controller 1 the IP and MAC addresses of a specific node 110 to be discovered.

In this embodiment and in the other embodiments of FIGS. 9, 10, 11, and 14 herein after described, any time there is more than one agent device 120, network administrator can select which is the preferred agent device to be used or can leave this choice to the remote controller 1. In the latter case the remote controller 1 can, for example, select the agent device that minimizes or maximizes some metric related to the node 110 and the agent device 120 itself (e.g. maximize availability of the connection between agent device 120 and node 110, minimize the difference between the agent device interface IP address and the node IP address, minimize the time of latest connection between agent device 120 and node 110). The remote controller 1 can also select more than one agent device 120 and execute the following steps for each selected agent device in parallel or in sequence: this possibility allows to reach nodes 110 connected only to an agent device, hiding to the network administrator the complexity of agent device selection.

At block 802 the remote controller 1 instructs the agent device 120 to contact the specific node 110 at the specified IP address. If required (that is, if a node is reached that has a MAC address different from the specified MAC address), the agent device 120 (automatically or under the control of the remote controller 1) invokes an IP conflict avoidance procedure, as described in further detail below with reference to FIG. 12.

If required, (that is, if the specified IP address is not included in any subnet IP identifier of the interfaces of agent device 120 and/or if the specified IP address corresponds to the IP address of the agent device interface), at block 802 the agent device 120 (automatically or under the control of the remote controller 1) can also invoke a subnet conflict avoidance mechanism, as described in further detail below with reference to FIG. 13.

At block 803 the remote controller 1 (or agent device 120) checks if a node having an IP conflict with the specific node 110 has been discovered during any execution of the IP conflict avoidance procedure.

In the positive case, at block 806 the remote controller 1 adds the IP and MAC addresses of the conflicting node in the first section 900 of database 14 in the list of "discovered nodes".

Anyhow, at block 804 the remote controller 1 (or agent device 120) checks if the specific node 110 with the specified IP and MAC address has been reached.

In the negative case, at block 807 the remote controller 1 adds the specified IP and MAC addresses in the first section 900 of database 14 in the list of "unreachable nodes".

In the positive case, at block 805 the remote controller 1 adds the specified IP and MAC addresses in the first section 900 of database 14 in the list of "available discovered nodes".

Figure 9:
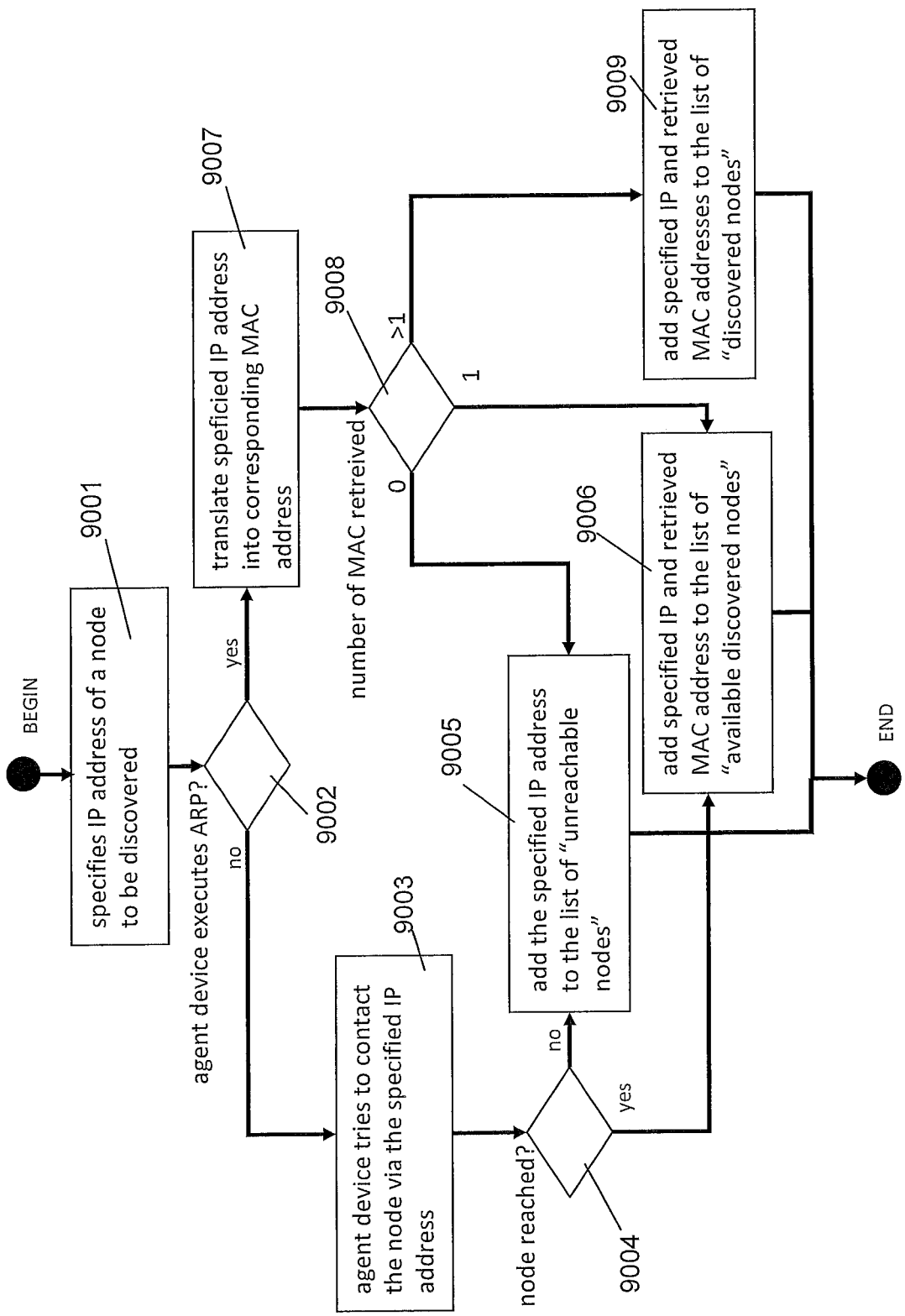
FIG. 9 shows a flowchart of an algorithm to implement a discovery procedure according to a second embodiment of the invention.

FIG. 9 shows a second embodiment of the discovery procedure, making use of only IP addresses.

At block 9001 network administrator specifies to the remote controller 1 only the IP address of a specific node 110 to be discovered.

The next step depends on capabilities of the agent device 120.

At check 9002, it is checked (by the remote controller or agent device 120) if the agent device 120 supports a translation protocol for resolution of IP addresses into MAC addresses, as for example the ARP.

In the negative case, at block 9003 agent device 120 tries to contact the specific node 110 by using the specified IP address.

At block 9004, the remote controller 1 (or agent device 120) checks if a node 110 with the specified IP address has been reached.

In the negative case, at block 9005 the remote controller 1 adds the specified IP address in the first section 900 of database 14 in the list of "unreachable nodes" and the procedure ends.

In the positive case, at block 9006 the remote controller 1 adds the specified IP address and the MAC address, as retrieved by the node 110, in the first section 900 of database 14 in the list of "available discovered nodes".

When the check at block 9002 is positive (that is the agent device 120 supports a translation protocol), at block 9007 the agent device 120 sends a suitable request (e.g. ARP request) to the LAN 100 in order to translate the specified IP address into a corresponding MAC address, according to the translation protocol.

At block 9008 the remote controller 1 checks if any MAC address has been received as answer to the request.

If no MAC address is received, at block 9005 the remote controller 1 adds the specified IP address in the first section 900 of database 14 in the list of "unreachable nodes" and the procedure ends.

If only one MAC address is received, at block 9006 the remote controller 1 adds the specified IP address and the received MAC addresses in the first section 900 of database 14 in the list of "available discovered nodes".

If more than one MAC address is received, at block 9009 the remote controller 1 adds the specified IP address with associated the plurality of received MAC addresses in the first section 900 of database 14 in the list of "discovered nodes". In this case, the remote controller 1 (automatically or under the control of the network administrator) will have to solve the IP conflict, as explained for example hereinafter.

Figure 10:
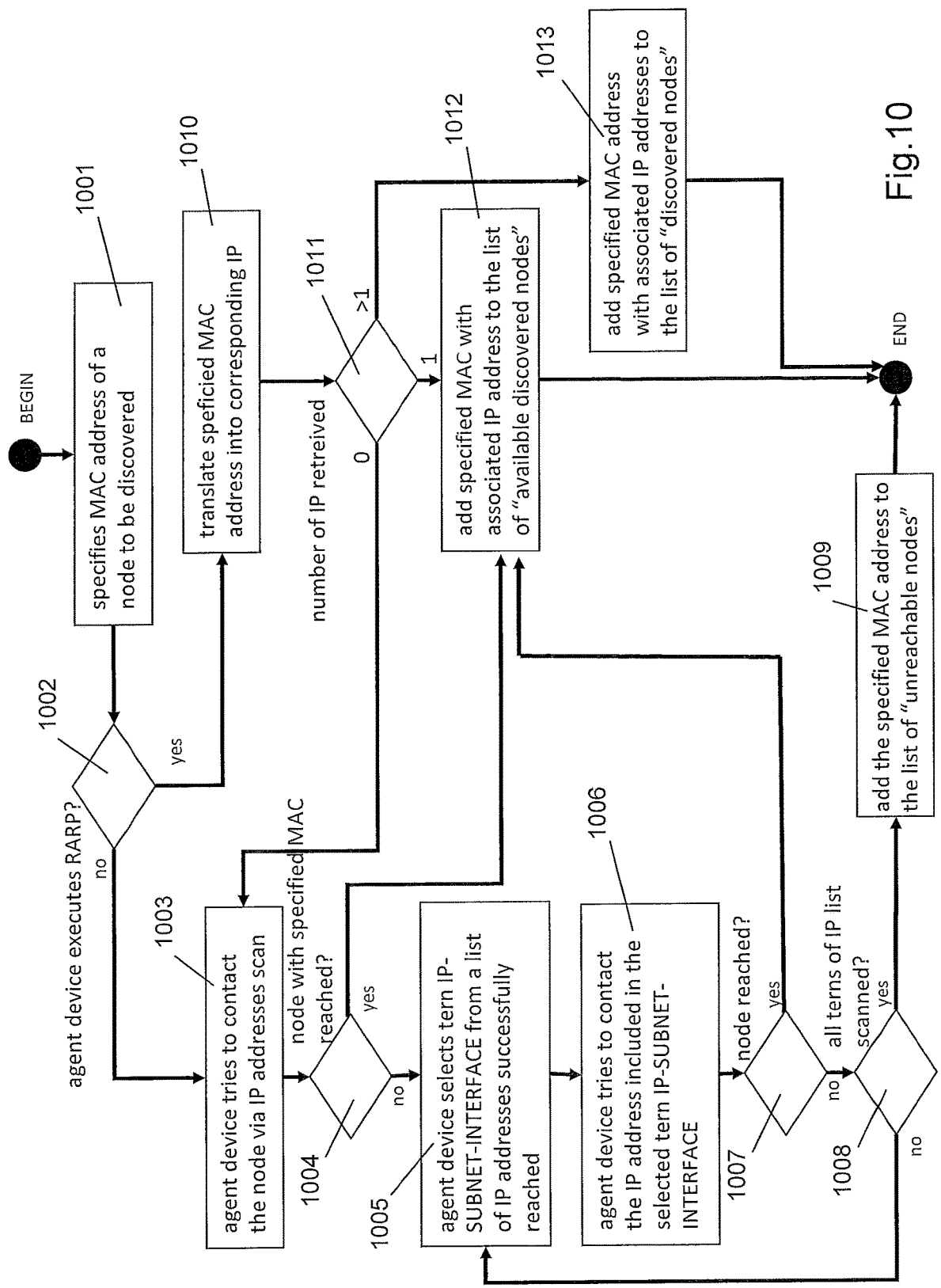
FIG. 10 shows a flowchart of an algorithm to implement a discovery procedure according to a third embodiment of the invention.

FIG. 10 shows a third embodiment of the discovery procedure, making use of only MAC addresses of nodes 110 to be discovered.

At block 1001 network administrator specifies to the remote controller 1 only the MAC address of a specific node 110 to be discovered.

The next step depends on capabilities of the agent device 120.

At check 1002, it is checked (by the remote controller or agent device 120) if the agent device 120 supports a translation protocol for resolution of MAC addresses into IP addresses, as for example the RARP.

In the negative case, at block 1003 the agent device 120 (automatically or under the control of remote controller 1) tries to reach the specific node by making a first scan of IP addresses. The scan can be made by applying the procedure described below with reference to FIG. 11 and stopping it when a node with the specified MAC address is reached.

At block 1004, the remote controller 1 checks if the specific node with the specified MAC address has been found during the first scan.

In the positive case, at block 1012 the remote controller 1 adds the specified MAC address with the associated IP address into the list of "available discovered nodes" of the first section 900 of database 14 and the procedure ends.

In the negative case, before considering the node as unreachable, at blocks 1005 and 1006, the agent device 120 (automatically or under the control of remote controller 1) preferably executes a second scan trying to reach all IP addresses successfully reached by the agent device 120, during the first scan of block 1003.

These IP addresses are contained in an IP-list created by the agent device 120 during the first scan, which includes the term IP-SUBNET-INTERFACE (i.e., IP address, subnet identifier and interface identifier) indicating, for each IP address reached by agent device 120 during the first scan, the identifier of the subnet and the identifier of the agent device interface at which the IP address has been reached.

At block 1005 the agent device 120 (automatically or under the control of remote controller 1) selects one term IP-SUBNET-INTERFACE from said IP-list.

At block 1006 the agent device 120 (automatically or under the control of remote controller 1) tries to contact the IP address included in the term selected at block 1005 through the interface included in said term by invoking, if required, the subnet conflict avoidance procedure and, optionally, the IP conflict avoidance procedure, according to the procedures detailed hereinafter.

The second scan performed at blocks 1005 and 1006 is useful for reaching a node identified by the specific MAC address that might be hidden by an IP address contained in the IP-list, due to an IP conflict.

At block 1007, the remote controller 1 (or agent device 120) checks if a node has been reached.

In the positive case, at block 1012 the remote controller 1 adds the specified MAC address with the corresponding IP address in the first section 900 of database 14 in the list of "available discovered nodes" and the procedure ends.

In the negative case, at block 1008 the remote controller 1 (or agent device 120) checks if all IP-SUBNET-INTERFACE terms from said IP-list have been scanned.

In the negative case, the procedure returns at block 1005.

In the positive case (that is, when no device with an IP address included in the IP-list and the specified MAC address has been reached), at block 1009 the remote controller 1 adds the specified MAC address in the first section 900 of database 14 into the "unreachable nodes" list.

In the positive case of block 1002 (that is, when the agent device supports a translation protocol for resolution of MAC addresses into IP addresses), at block 1010 the remote controller 1 sends, through the agent device 120, a request (e.g. RARP request) into the LAN 100 in order to translate the specified MAC address into a corresponding IP address.

At block 1011 the remote controller 1 checks if any IP address has been received as answer to the sent request.

If no IP address is received, the procedure continues at block 1003.

If only one IP address is received, at block 1012 the remote controller 1 adds the specified MAC address with the received IP address in the first section 900 of database 14 in the list of "available discovered nodes".

If more than one IP address is received (e.g., when there are aliases on an interface of a node 110 so that there is more than one IP address associated with such interface or there is a MAC conflict case), at block 1013 the remote controller 1 adds the specified MAC address with associated the plurality of received IP addresses in the first section 900 of database 14 in the list of "discovered nodes". Then, the remote controller 1 (automatically or under the control of the network administrator) can, for example, decide to use indiscriminately any of the IP addresses any time it needs to reach the node or to choose a specific one to use.

According to a preferred embodiment of the invention, a scan based discovery procedure is also contemplated, which can be implemented automatically by the remote controller 1 without requiring any information from the network administrator.

According to this scan based discovery procedure, a plurality of subnet identifiers is considered. Nodes 110 in LAN 100 are discovered by trying to contact—through all agent device interfaces—all IP addresses (or a selected subpart) corresponding to such plurality of subnet identifiers (that is, by trying to contact all possible combinations of IP addresses obtainable with the subnet identifiers).

The plurality of subnet identifiers preferably includes the subnet identifiers associated with the interfaces of the agent device 120 and, preferably, also a plurality of subnet identifiers, corresponding to typical (preferably known a-priori) subnet identifiers set by default by different manufacturers/vendors. This last feature advantageously allows extending the search to IP addresses, set by default by different manufacturers/vendors, which can belong to a subnet different from the ones covered by the agent device interfaces.

Figure 11:
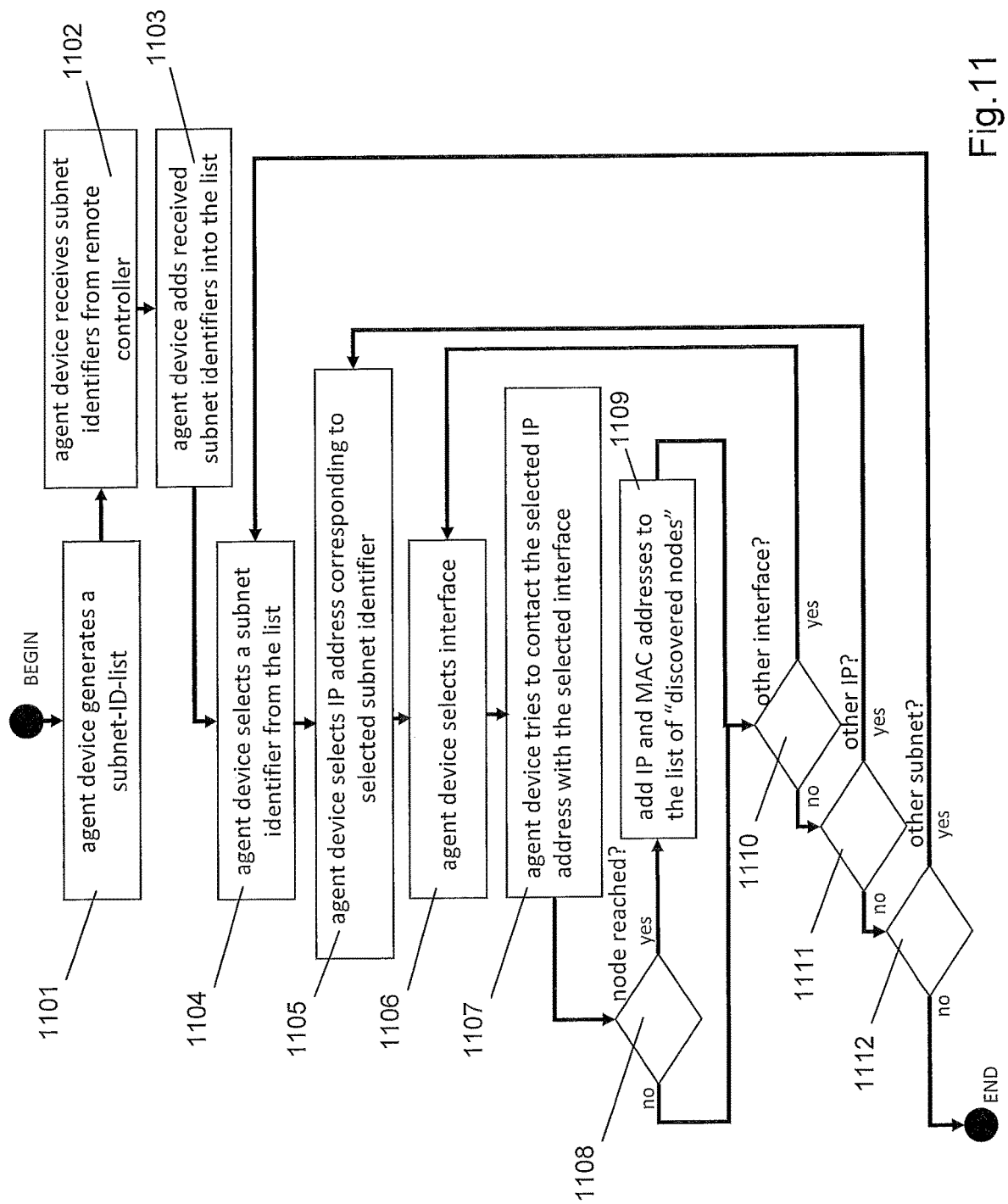
FIG. 11 shows a flowchart of an algorithm to implement a discovery procedure according to a fourth embodiment of the invention.

FIG. 11 shows an exemplary scan based discovery procedure according to a preferred embodiment of the invention.

At block 1101, the agent device 120 (under the control of remote controller 1) generates a subnet-ID-list and adds into said subnet-ID-list the identifiers of the subnets covered by the agent device interfaces.

At block 1102 the remote controller 1 sends to the agent device 120 a plurality of subnet identifiers, corresponding to typical (preferably known a-priori) subnet identifiers set by default by different manufacturers/vendors.

At block 1103, the agent device 120 adds them into the generated subnet-ID-list.

At block 1104, the agent device 120 (automatically or under the control of remote controller 1) selects from the generated subnet-ID-list a non-scanned subnet identifier.

At block 1105, the agent device 120 (automatically or under the control of remote controller 1) selects a non-scanned IP address from all possible IP addresses corresponding to the selected subnet identifier.

At block 1106, the agent device 120 (automatically or under the control of remote controller 1) selects an agent device interface that has not been tried yet with the selected IP address. Preferably, the selection can be performed such as to minimize the distance between the selected IP address and the identifier of the subnet corresponding to the interface.

At block 1107, the agent device 120 (automatically or under the control of remote controller 1) tries to contact the selected IP address through the selected interface. If required, the subnet conflict avoidance mechanism will be invoked, as detailed hereinafter.

At block 1108, the remote controller 1 (or agent device 120) checks if a node 110 has been reached.

In the positive case, at block 1109, the remote controller 1 adds the IP and MAC addresses of the reached node in the first section 900 of database 14 in the "discovered nodes" list. Advantageously, the subnet and interface identifiers are also recorded. In fact, it can happen that a same IP address is reached through different interfaces, e.g. because different nodes connected to different interfaces are configured with identical, initial default IP address.

Anyhow, at block 1110, the remote controller 1 (or agent device 120) checks if there are other non-tried interfaces of agent device 120 for the selected IP address. In the positive, the procedure continues at block 1106. In the negative, at block 1111, the remote controller 1 (or agent device 120) checks if there are other non-scanned IP addresses for the selected subnet. In the positive, the procedure continues at block 1105. In the negative, at block 1112, the remote controller 1 (or agent device 120) checks if there are other non-scanned subnets. In the positive, the procedure continues at block 1104. In the negative, the procedure ends (that is, all IP addresses of all subnets have been tried through all interfaces of the agent device 120).

Advantageously, the scan based discovery procedure of FIG. 11 can be made more efficient if, before execution of the scan, at least one technique is used in order to check if it is possible to obtain couples of IP/MAC addresses for at least part of nodes 110 of LAN 100.

Examples of such techniques are:
use of broadcast ping according to ping utility well known in the art (as for example defined in RFC 792);
adopting IP sniffing techniques, or other passive scan techniques known in the art in order to monitor the traffic of the LAN and to discover the existence of nodes;
well-known device discovery protocols, such as UPnP (Universal Plug and Play, as for example described at the Internet website www.upnp.org), Bonjour (as for example described at the website http://developer-apple.com/opensource/), Zero-Configuration Networking (as, for example, defined by RFC 3927), or similar, that would allow the agent device 120 to receive specific messages sent by auto-declaring nodes, supporting themselves such protocols.

The use of such techniques advantageously allows to limit the scan procedure to IP addresses not retrieved through any of such techniques (the ones retrieved can be discovered by using the discovery procedure of FIG. 8) and to get to know about any IP address optionally included in the LAN 100 but not included in the subnet-ID-list generated at blocks 1101-1103.

Preferably, the range of IP addresses the agent device 120 can access and detect is configured in order to increase security level. This way the network administrator can decide which subset of nodes 110 is visible by the agent device 120 and, as a consequence, will be manageable through the remote controller 1. The address range can be specified in different well-known techniques, e.g. using whitelists or blacklist.

It is further observed that even if in the embodiment of FIG. 11 IP addresses are scanned considering—for each subnet identifier—all possible IP addresses corresponding to said subnet identifier and—for each IP address—all possible agent device interface, the scan can be carried out considering a different scanning sequence. For example, IP addresses can be scanned considering—for each agent device interface—the various subnet identifiers from the subnet-ID-list and—for each subnet identifier—all possible IP addresses corresponding to said subnet identifier.

In a LAN 100 where multiple generic vendor nodes are deployed with their default configuration, it is very likely that two or more nodes are initially associated with a same IP address, though having a different MAC address. This event draws to IP conflicts so that no one of those nodes can be properly reached via IP by the agent device 120, according to standard networking techniques.

For this reason, in a preferred embodiment, the invention provides a mechanism that allows the agent device 120 to exclude all nodes with the same IP address except one having a specified MAC address, and to contact it.

According to this mechanism, after a tunnel connection with remote controller 1 is established by agent device 120, when the remote controller 1 needs to connect to a specific node 110 of the LAN by using a specific IP address and MAC address, an IP conflict avoidance procedure is advantageously executed by the agent device 120 (automatically or under the control of remote controller 1) for guaranteeing connection to the specified IP address and MAC address even in case the specified IP addresses is associated with multiple MAC addresses.

Figure 12:
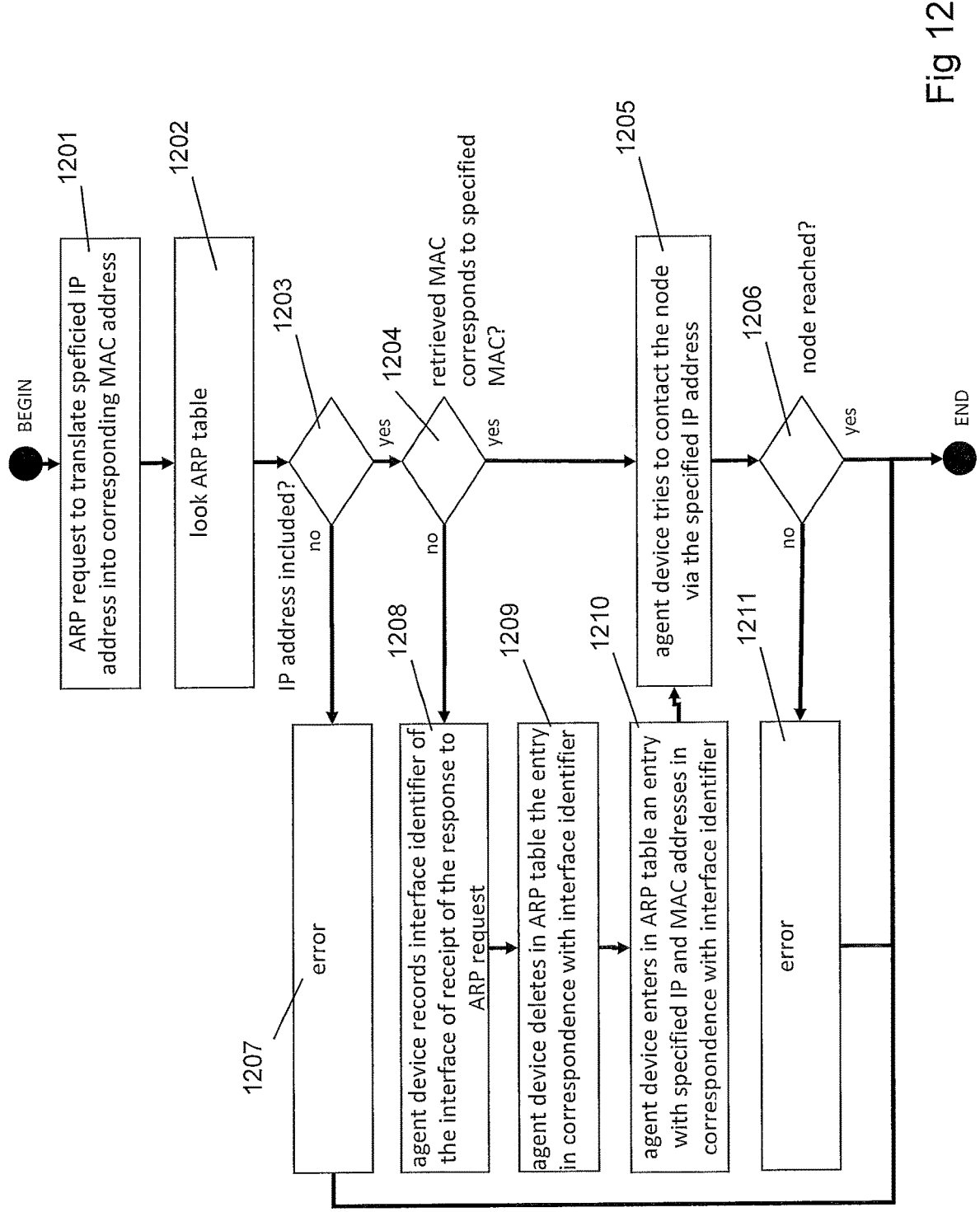
FIG. 12 shows a flowchart of an algorithm to implement an IP conflict avoidance procedure according to an embodiment of the invention.

FIG. 12 shows the IP conflict avoidance procedure according to an embodiment of the invention, wherein the agent device 120 supports the ARP protocol, including ARP table.

According to ARP protocol, the ARP table of the agent device 120 will contain, for each agent device interface, entries represented by couples of IP/MAC addresses of nodes 110 of the LAN 100. These entries are updated each time the agent device sends ARP requests into the LAN 100. According to ARP protocol, the ARP able can contain only one entry for each IP address. Therefore, if more than one node replies to an ARP request, the ARP table is updated with a couple IP/MAC address corresponding to only one of the replying nodes (for example, the last node answering to the ARP request).

At block 1201 the agent device 120, needing to contact a specific node identified by a specified IP address and a specified MAC address, sends (automatically or under the control of remote controller 1) an ARP request for translating the specified IP address.

After sending the ARP request, at block 1102 the agent device 120 (automatically or under the control of remote controller 1) looks at its ARP table.

At block 1203, the agent device 120 (automatically or under the control of remote controller 1) checks if the ARP table includes the specified IP address.

In the positive case, at block 1204 the agent device 120 (automatically or under the control of remote controller 1) checks if the retrieved MAC address, i.e. the one associated in the ARP table with the specified IP address, is equal to the specified MAC address, i.e. the one that should be contacted.

In the positive case, at block 1205 the agent device (automatically or under the control of remote controller 1) tries to reach the node by using the specified IP address.

At block 1206 the agent device (automatically or under the control of remote controller 1) checks if the node has been reached. In the positive case, the procedure ends. In the negative case, at block 1211 a specific error is returned and the procedure ends.

In the negative case of block 1203 (that is, the ARP table does not include the specified IP address) a specific error is returned and the procedure ends.

In the negative case of block 1204 (that is the retrieved MAC address is not equal to the specified MAC address), at block 1208 the agent device 120 (automatically or under the control of remote controller 1) records the interface identifier through which it received the response to the ARP request.

At block 1209 the agent device 120 deletes in the ARP table the entry in correspondence with the recorded interface identifier that contains the specified IP address and the retrieved MAC address.

At block 1110 the agent device 120 adds into the ARP table, in correspondence with the recorded interface identifier, an ARP entry containing the specified IP address and the specified MAC address.

From block 1110 the procedure continues at block 1205.

The steps at blocks 1208 to 1210 allow the agent device to contact the node identified by the specific IP address and the specific MAC address, avoiding interference with other conflicting nodes having the same IP address but different MAC address.

A periodic use of the IP conflict avoidance procedure, also after the initial setup of LAN 100, advantageously allows the remote controller 1 to raise warnings to the network administrator any time there is an IP conflict, e.g. generated by the connection of a new conflicting node to the LAN 100, in a moment successive to the initial setup.

According to a preferred embodiment (not shown), any time the IP conflict avoidance procedure avoids a conflict through execution of steps 1208 to 1210, the IP and MAC addresses of the conflicting nodes are added into the list of "discovered nodes" included in the first section 900 of database 14 of remote controller 1 (as explained, for examples, at block 806 of FIG. 8).

This allows the remote controller 1 to have knowledge of the IP conflicting nodes of the LAN 100 and to execute a mechanism for solving the IP conflicts and guaranteeing correct standard networking protocols operations.

The mechanism for solving the IP conflicts can be executed automatically by the remote controller 1 or under the control of the network administrator.

According to an embodiment, the conflict resolution mechanism can collect all MAC addresses of the conflicting nodes and assign to each one a specific IP address, in compliance with an addressing plan, using the IP conflict avoidance procedure as described above.

For example, if node AA:AA:AA:AA:AA:AA, BB:BB:BB:BB:BB:BB, CC:CC:CC:CC:CC:CC has the same IP address 192.168.0.1, the conflict resolution mechanism would:

contact IP address 192.168.0.1 applying the conflict avoidance procedure for forcing MAC address AA:AA:AA:AA:AA:AA, change IP address of device AA:AA:AA:AA:AA:AA from 192.168.0.1 to 192.168.0.101, contact IP address 192.168.0.1 applying conflict avoidance for forcing MAC address BB:BB:BB:BB:BB:BB, change IP address of device BB:BB:BB:BB:BB:BB from 192.168.0.1 to 192.168.0.102, contact IP address 192.168.0.1 applying conflict avoidance for forcing MAC address CC:CC:CC:CC:CC:CC change IP address of device CC:CC:CC:CC:CC:CC from 192.168.0.1 to 192.168.0.103

After this sequence, the three nodes are no longer in conflict.

When the agent device 120 has more than one interface, the network conflict resolution mechanism can use a subnet conflict avoidance mechanism (described hereinafter) to contact each node and will assign IP addresses that are consistent with each identifier of the subnets covered by the agent device interfaces.

It is observed that, when a node 110 of LAN 100 has an IP address that is not included in any subnet of the interfaces of the agent device 120 or that is the same of the agent device interface, that node would not be reachable by the agent device 120 according to standard networking techniques. For this reason, in a preferred embodiment, a subnet conflict avoidance procedure is used, which forces the agent device 120 to contact a specific IP address through a specific interface.

Figure 13:
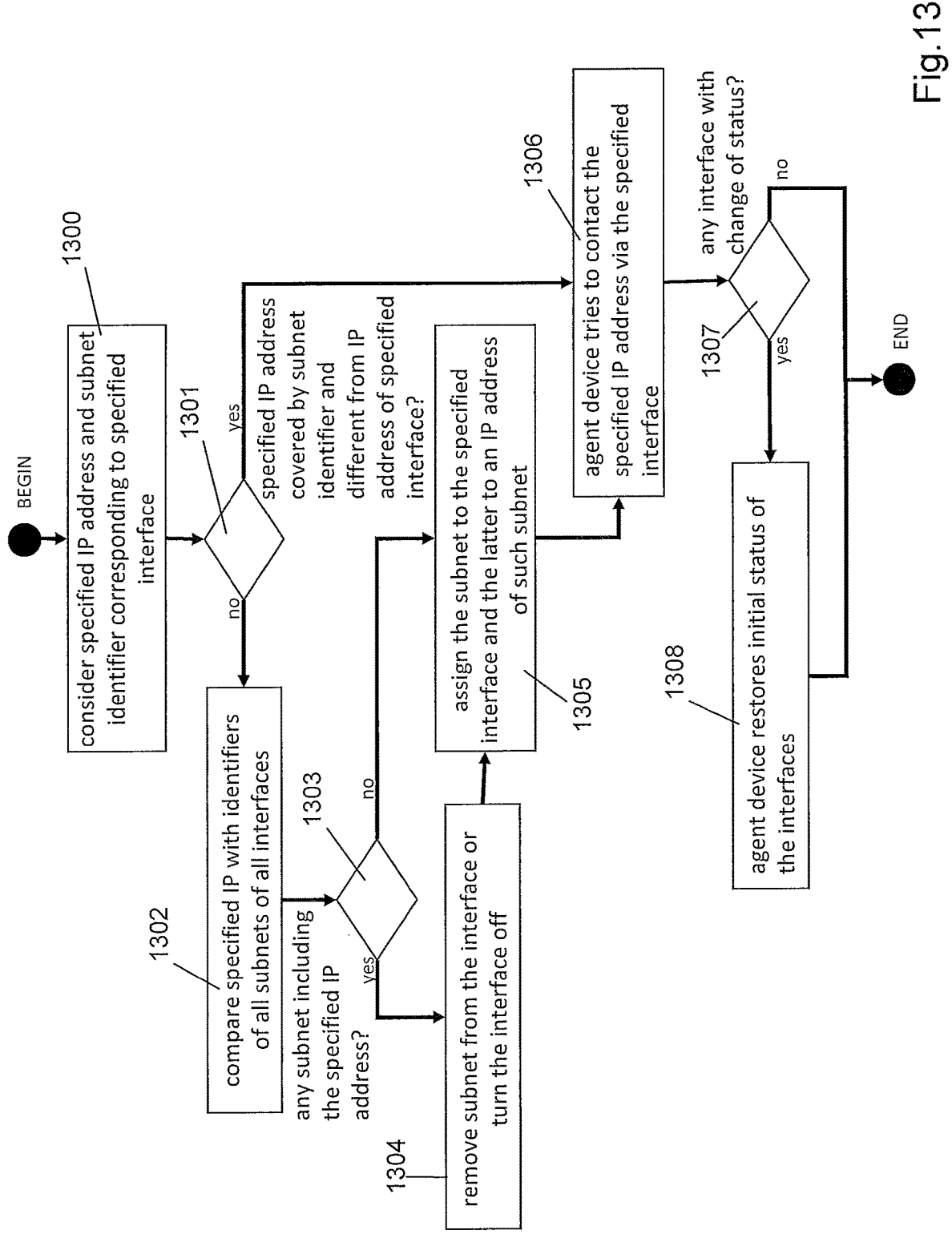
FIG. 13 shows a flowchart of an algorithm to implement a subnet conflict avoidance procedure according to an embodiment of the invention.

FIG. 13 shows an embodiment of subnet conflict avoidance procedure for contacting a specified IP address through a specified interface.

At block 1300 the agent device 120 (automatically or under the control of remote controller 1) considers the specified IP address, i.e. the one that it has to contact, and the identifier of the subnet corresponding to the specified interface, i.e. the interface through which it has to contact the specified IP.

At block 1301 the agent device 120 (automatically or under the control of remote controller 1) checks if the specified IP address is covered by the considered subnet identifier and if the IP address of the specified interface is different from the specified IP address.

In the negative case, at block 1302 the agent device 120 (automatically or under the control of remote controller 1) compares the specified IP with the identifiers of all the subnets of all the interfaces of the agent device 120.

At block 1303 the agent device 120 (automatically or under the control of remote controller 1) checks if there is any subnet including the specified IP address.

In the positive case, at block 1304, the agent device 120 (automatically or under the control of remote controller 1) removes the subnet from the interface to which the subnet is associated or turns such interface off. This step is useful to avoid the case of having two agent device interfaces with associated a same subnet.

Anyhow, at block 1305 the agent device 120 (automatically or under the control of remote controller 1) assigns the subnet corresponding to the specified IP address to the specified interface and assign to the specified interface an IP address of such subnet, which is different from the specified IP address. This assignment can be done according to techniques well known in the art.

At block 1306, the agent device 120 (automatically or under the control of remote controller 1) tries to contact the specified IP address through the specified interface.

When a MAC address is also specified, in case of IP conflict, the IP conflict avoidance procedure can be invoked at block 1306 in order to reach the node having both the specified IP address and the specified MAC address.

At block 1307 the agent device 120 (automatically or under the control of remote controller 1) checks if the status of any interface (that is, on/off, IP address, subnet) has been modified.

In the negative case the procedure ends.

In the positive case, at step 1308 the agent device 120 (automatically or under the control of remote controller 1) restores the initial status of the interfaces and the procedure ends.

It is observed that when the specified IP address corresponds to the IP address of the specified interface, actions at block 1305 will assign to the specified interface a temporarily different IP address. In this case, disconnections between the remote controller 1 and agent device 120 might occur, when the specified interface is the same as the one used for the remote controller 1-agent device 120 connection. If this happens, the agent device 120 will have to re-establish the connection with the remote controller 1. This can be done, for example, in two ways: 1) the agent device 120 keeps the new assigned IP address for the specified interface and re-establish a connection; 2) the agent device 120 continuously switches between the new assigned IP address and the specified IP address, for respectively contacting the node and the remote controller 1.

According to the management method of the present disclosure, after executing a discovery procedure according to any of the embodiments described with reference to FIGS. 8 to 11 (eventually using the IP conflict avoidance procedure and/or the subnet conflict avoidance procedure described with reference to FIGS. 12 and 13), the remote controller 1 executes an identification process for identifying the nodes 110 whose identifiers have been discovered via the discovery procedure.

The remote controller 1 may identify the nodes by retrieving the characterizing parameter identifying the nodes from the database (e.g. wherein they can be pre-stored by a network administrator), or by obtaining them as input parameters (e.g. from the network administrator). In a preferred embodiment, useful when there is not a priori knowledge of the characterizing parameters of the nodes, the remote controller identifies the nodes by obtaining the characterizing parameter directly from the nodes. In this preferred embodiment, hereinafter described, the remote controller 1—by using specific identification procedures in the application layer 7—tries to establish a proper connection with the nodes 110 to perform authentication and to successfully exchange data with them.

In particular, in the context of the present disclosure, wherein the nodes 110 to be managed by remote controller 1 are of multiple and/or generic vendors, models, hardware versions, firmware versions, chipset types, and when there is not a priori knowledge of the characterizing parameters of the nodes, the identification process according to said preferred embodiment advantageously enables the remote controller 1 to automatically identify (determine) the characterizing parameters of each node, to fill the second section 910 of database 14 by associating the node identifiers (as previously discovered during the discovery procedure) with the corresponding, identified characterizing parameters, and to add the identified nodes into the first section 900 of database 14 as "identified nodes" 904.

It is observed that the remote controller 1 can successfully identify the nodes 110 and, in particular connect to the nodes 110, perform authentication and obtain the node characterizing parameters directly from them, only if it "speaks" the same language of the nodes 110. In other words, the remote controller 1 can successfully identify each node 110 only if it uses the proper identification procedure that implements protocols and mechanisms in the layer 7 that match those implemented by the specific stock firmware version of the node 110. Indeed, even if the remote controller 1 was able to discover the nodes and to reach them in the layer 3 (e.g. IP) or layer 2 (e.g. MAC), it may happen that it is unable to successfully identify the nodes, if it doesn't "speak" the specific language of each node 110 in the layer 7.

As there is not a priori knowledge of the characterizing parameters of the nodes, in the preferred embodiment the remote controller 1 executes in sequence a plurality of identification procedures till the identification procedure that matches the language of the specific node (in the layer 7) is successfully found.

FIG. 14 shows an identification process according to a preferred embodiment of the invention. This process is based on a structure of database 14 according to the embodiment of FIG. 4 and on an a-posteriori knowledge of the content of second section 910 of database 14 (the content of fourth section 930 being know a-priori, as already stated above). Indeed, second section 910 is filled and updated during the execution of this identification process.

At block 1501 the remote controller 1 selects a node 110 from the list of nodes contained in first section 900 of database 14 (as updated by the discovery procedure previously executed). Preferably, only the nodes classified as "available—discovered" and, optionally, "discovered" are taken into account.

At block 1502, the remote controller 1 selects, from the list of sequences of identification procedures stored into sixth section 911 of database 14, a sequence of identification procedures that is supposed to include a correct procedure for the specific, even if not characterized, node 110. This choice is done according to a predetermined selection criterion. Advantageously, the selection criterion aims at minimizing the number of identification procedures to be tested before successfully identifying the node 110. For example, the selection criterion for an identification procedure can be the average time for the identification procedure to be successful, the difference between the MAC address of the selected node 110 and the MAC address of nodes 110 which have already been successfully associated with the identification procedure, or being part of a list of procedures associated with a predetermined vendor, which has been specified by the network administrator as vendor for the node(s) 110. Advantageously, the list of sequences stored in section 911 includes a default sequence that contains all the identification procedures available in the database, section 911, even if this solution wouldn't be optimized.

At block 1503, the remote controller 1 tries the identification procedures of the selected sequence. In particular, at block 1503, the remote controller 1 tries to use in sequence the identification procedures to connect to the node 110, to be authenticated by the node 110 and to obtain the characterizing parameters of the node 110.

At block 1504 the remote controller 1 checks if at least one identification procedure of the selected sequence is successful (that is, if the connection and authentication have been successful performed and the characterizing parameters of the node 110 have been obtained).

In the positive case of block 1504, the node 110 is considered identified and at block 1505 the remote controller 1 adds the identifier (e.g. IP and/or MAC address) of the node 110 into the list 904 of "identified nodes" in first section 900 of database 14 and into the second section 910 of database 14, associated with the characterizing parameters obtained from the node 110 itself during the identification procedure.

In the negative case of block 1504, at block 1507 the remote controller 1 checks if the list of sequences of identification procedures stored into sixth section 911 of database 14 is terminated.

In the positive case of block 1507, at block 1508 the remote controller 1 records a warning containing all the details of the unsupported node 110. In the negative case of block 1507, the procedure returns to block 1502.

After block 1508 or 1505 the procedure continues at block 1506, where it is checked if all nodes 110 (preferably, only those classified as "available-discovered" and, optionally, "discovered") from the list of nodes contained in first section 900 of database 14 have been taken into account.

In the positive case the procedure ends. In the negative case, the procedure returns to block 1501.

An example of this embodiment is reported for the sake clarity:
first section 900 of the database 14 contains the node identifiers, among which the MAC address AA:BB:CC:DD:EE:FF of the node that must be identified;
second section 910 of database 14 is empty, as per each MAC address specified by the network administrator, no characterizing parameters (e.g. vendor, model, firmware version) are available;
section 911 of database 14 contains different sequences of identification procedures:
Sequence1: IdentificationProcedureA, IdentificationProcedureB;
Sequence2: IdentificationProcedureD, IdentificationProcedureC;
Sequence3: IdentificationProcedureA, IdentificationProcedureB, IdentificationProcedureC, IdentificationProcedureD, containing all identification procedures available; wherein:
IdentificationProcedureA matches vendor USRobotics, model usr808054, firmware 1.x and 2.x;
IdentificationProcedureB matches vendor USRobotics, model usr808054, firmware 4.x;
IdentificationProcedureC matches vendor Netgear, model WG101,WG102,WG103, firmware 3.1;
IdentificationProcedureD matches vendor Netgear, model WG001,WG002,SK999, firmware 2.

Each sequence is also characterized by metric parameters, e.g. the number of times it has been executed, the number of identifications tried and refused, the average number of identification procedures tried before success per each MAC address range, and similar. As this latter is a measure of the ability of the sequence itself to identify a node whose MAC lies in a specific range, and as known by those skilled in the art each MAC range is associated to a specific vendor, this metric can measure the ability of a sequence to identify a specific vendor but unknown model.

block 1501: the remote controller 1 selects from section 900 the MAC identifier, e.g. AA:BB:CC:DD:EE:FF, of the node 110 that must be identified in terms of characterizing parameters (e.g. vendor/model/firmware version);

block 1502: the remote controller 1 selects a sequence from section 911, in order to minimize some metric. If this metric is the average number of identification procedures tried before success, as detailed above, Sequence2 would be chosen: it contains procedures that succeed with MAC addresses that lie in the Netgear range, as MAC AA:BB:CC:DD:EE:FF does;

block 1503: the remote controller 1 selects the IdentificationProcedureD, as it corresponds to the first identification procedure of the chosen sequence (Sequence2) and executes it; IdentificationProcedureD fails, as it is related to a model that is different from the node whose MAC is AA:BB:CC:DD:EE:FF; then the remote controller 1 selects the second procedure of Sequence2, which is IdentificationProcedureC, and executes it; as the node vendor/model/firmware-version correspond to the ones supported by IdentificationProcedureC, the procedure succeeds and node AA:BB:CC:DD:EE:FF characterizing parameters are retrieved: vendor Netgear, model WG103, firmware version 3.1;

block 1505: as IdentificationProcedureC succeeded, the remote controller 1 can associate the node MAC AA:BB:CC:DD:EE:FF with: vendor Netgear, model WG103, firmware version 3.1, in section 910 of the database 14.

Advantageously, the identifying process of FIG. 14 can be made more efficient if, before execution of the procedure, at least one of the techniques mentioned above with reference to the scan discovery procedure (e.g., UPnP, Bonjour, Zero-Configuration Networking) is used in order to check if it is possible to obtain couples of IP/MAC addresses together with some characterizing parameters (e.g. vendor) for at least part of nodes 110 of LAN 100.

This would allow the remote controller 1 (or agent device 120) to have a-priori knowledge of some characterizing parameters that can be used at block 1502 in order to optimize the selection of an appropriate sequence of identification procedures.

Once the identifiers (e.g. IP addresses and/or MAC addresses) of the nodes 110 have been discovered by executing the discovery procedure (e.g. according to any of the embodiments described with reference to FIGS. 8 to 11), and the characterizing parameters of the nodes 110 have been identified by executing the identification process (e.g. according to the preferred embodiment described with reference to FIG. 14), the remote controller 1 accesses the database 14 for retrieving—for each node 110 which has been successfully identified contained in the list of "identified nodes" 904—the specific upgrade procedure and specific controller firmware which is associated, in fourth section 930 of database 14, with the instance corresponding to the identified characterizing parameters of the node 110.

The specific upgrade procedure enables the remote controller 1 to access the node 110 and to load the specific controller firmware onto it.

As stated above, the nodes 110 initially have specific stock firmwares, each implementing a stock set of features and requiring the use by the remote controller 1 of specific procedures (e.g. specific identification procedures and upgrade procedures) to manage the nodes 100, which may vary from node to node. The nodes 110 are upgraded by the remote controller 1 by replacing the specific stock firmwares originally present in the nodes 110 with specific controller firmwares by means of the specific upgrade procedures. The remote controller 1 can successfully upgrade the nodes 110 and, in particular load the specific controller firmwares onto the nodes 110, only if it "speaks" the same language of the nodes 110. In other words, the remote controller 1 can successfully upgrade each node 110 only if it uses the proper upgrade procedure that implements protocols and mechanisms in the layer 7 that match those implemented by the specific stock firmware of the node 110.

Accordingly, the remote controller 1 uses, for each identified node 110, the retrieved specific upgrade procedure for loading the retrieved specific controller firmware onto the node 110, which replaces the stock firmware of the node 110.

As stated above, the specific controller firmwares provide all nodes 110 with a same uniform set of features and make all nodes 110 manageable by the remote controller 1 by means of a same uniform set of managing procedures (stored in the fifth section 940 of database 14).

In this way, once the stock firmwares of the nodes 110 are replaced by the node-specific controller firmwares, the nodes 110 all implement the same uniform set of features and can be managed (e.g. configured and/or monitored) by the remote controller according to the same uniform set of managing procedures.

Each node 110 is enabled to directly connect to the remote controller 1 (without intermediation of the agent device 120) and the remote controller 1 is enabled to directly manages the nodes 110 (without intermediation of the agent device 120), according to the uniform set of features and by using the uniform set of managing procedures.

Figure 2:
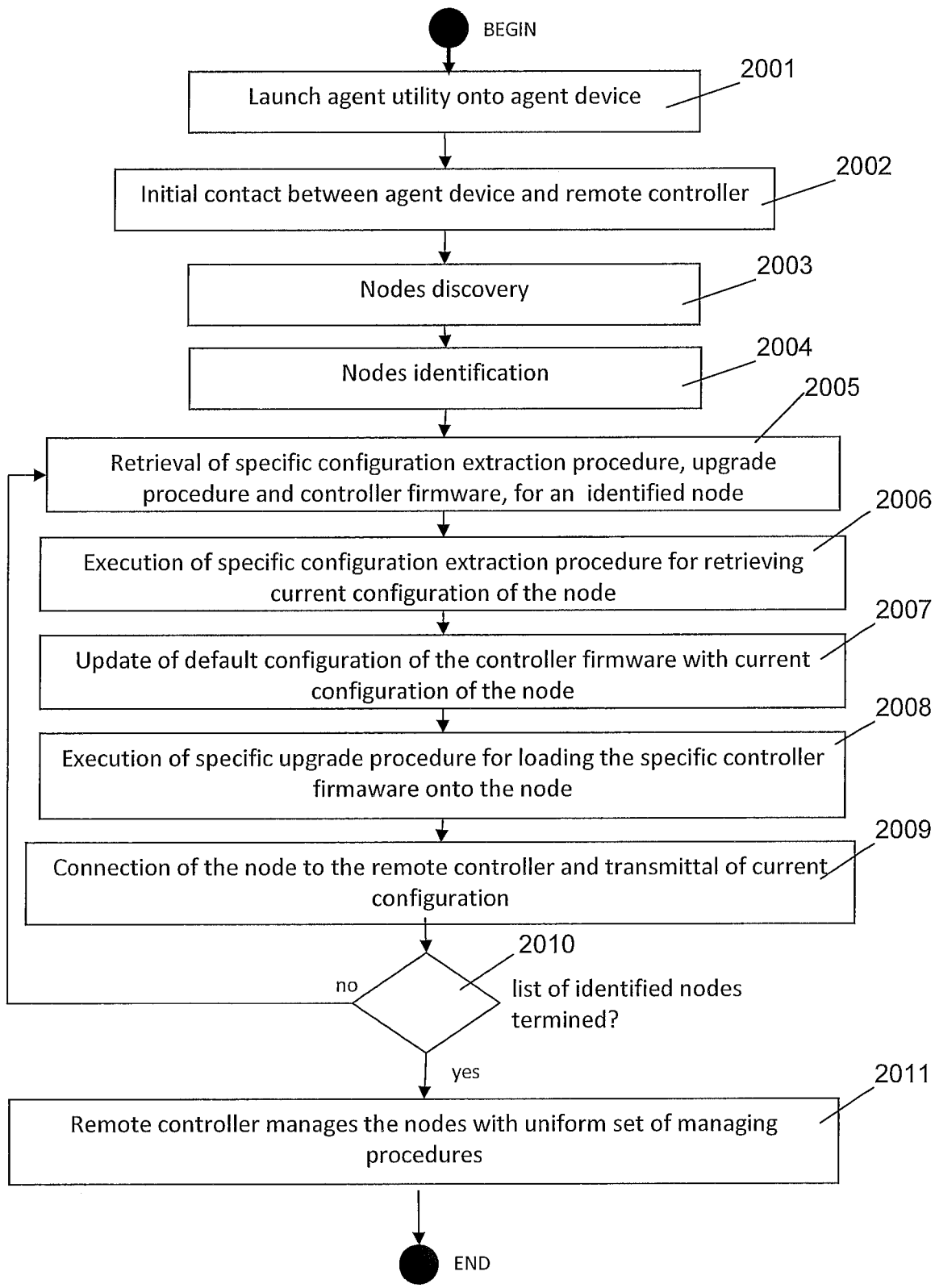

FIG. 2 shows a flow chart of an algorithm implementing the management method of the present disclosure according to a preferred embodiment of the invention.

At block 2001 the network administrator launches the agent utility in the agent device 120 in the LAN 100, via, for example, the user interface 129 of the agent device 120. The launch can also be implicit when the hardware where the agent is installed is turned on. The agent device 120 may be a mobile device, smartphone, tablet or laptop/server in the LAN 100.

At block 2002, the agent device 120 makes initial contact with the remote controller 1 in order to be authenticated and to establish a connection with the remote controller 1.

It is observed that at block 2001 the network administrator may launch the agent utility in the agent device 120, via the user interface 18 of the remote controller 1. In this case, the initial contact between the remote controller 1 and the agent device 120 will be established by the remote controller 1.

At block 2003, the remote controller 1 executes, via the intermediation of the agent device 120, the discovery procedure described above, for discovering nodes 110 of LAN 100.

At block 2004, the remote controller 1 executes, via the intermediation of the agent device 120, the identification procedure described above, for identifying the discovered nodes 110.

At block 2005, the remote controller 1 retrieves from fourth section 930 of database 14 the specific configuration extraction procedure, specific upgrade procedure and specific controller firmware for an identified node 110 selected from the list of identified nodes 904.

At block 2006, the remote controller 1 executes the specific configuration extraction procedure for accessing the node 110, via the intermediation of the agent device 120, retrieving its current configuration and storing it into the database 14.

At block 2007, the remote controller 1 modifies the specific controller firmware by updating its default configuration with information taken from the current configuration of the node 110.

Steps at block 2006 and 2007 are preferred, optional steps, which advantageously enable to recover the current configuration of the node, without loosing any important information. For example, steps at blocks 2006 and 2007 are advantageous in case the management method is applied onto a pre-existing LAN, wherein the nodes 110 are already configured (so that already configured parameters are not lost) and/or in case the LAN 100 does not support a protocol such as the Dynamic Host Configuration Protocol (DHCP), for dynamically distributing network configuration parameters, that enables the nodes 110 to obtain IP addresses and networking parameters for connecting to the Internet, automatically via the gateway 130. In the latter case, recovery of the current configuration of the node 110 is advantageous for restoring into the node 110 the Internet connection information that enables it to access the Internet of WAN 2 (e.g. the IP address of the gateway 130), and thus to access the remote controller 1. To this aim, it is noted that at block 2007 it may be sufficient to update the default configuration of the specific controller firmware with only part of the current configuration information (e.g. only with the information that enables the node 110 to access the Internet of WAN 2, such as IP address, Subnet Mask, Gateway, DNS).

In an alternative embodiment of the management method wherein steps at blocks 2006 and 2007 are not executed and the DHCP (or similar protocol) is not supported by the LAN 100, the information (e.g. the IP address of the gateway 130 and networking parameters) that enables the node 110 to access the Internet can be provided to the node 110 by the agent device 120. For example, parameters such as IP address, Subnet Mask, Gateway, DNS can be provided by the agent device 120 to the node 110 via well known LAN communication protocols such as Broadcast and Multicast or equivalent.

At block 2008, the remote controller 1 uses the specific upgrade procedure for accessing the node 110, via the intermediation of the agent device 120, and loading onto it the specific controller firmware, preferably with the default configuration as updated at block 2007.

At block 2009 the node 110, thanks to the specific controller firmware, directly connects to the remote controller 1 (without intermediation of the agent device 120) and sends it its current configuration. If necessary, the remote controller 1 sends back to the node 110 an updated configuration (e.g. comprising all information of the configuration of the node 110 previously stored at block 2006 and/or other specific configuration parameters taken from section 920 of database 14).

This last step wherein the remote controller 1 sends back to the node 110 an updated configuration (e.g. comprising all information of the configuration of the node 110 previously stored at block 2006) may be particularly advantageous in an alternative embodiment of the management method wherein step at block 2007 is not executed (e.g. because the LAN 100 supports the DHCP (or similar protocol) or because the information that enables the node 110 to access the Internet is provided to the node 110 by the agent device 120).

At block 2010, the remote controller 1 checks if all identified nodes 110 from the list of identified nodes 904 have been taken into account. In the negative case, the procedure returns to block 2005.

In the positive case, the procedure continues to block 2011, wherein the remote controller 1 directly manages the nodes 110 (without intermediation of the agent device 120), according to the uniform set of features and by using the uniform set of managing procedures.

In particular, at block 2011 the remote controller is ready to be used by the network administrator for executing managing operations on nodes 110, by using the uniform set of managing procedures 942, 943, 944 stored in the fifth section 940 of database 14.

In particular, the centralized configuration procedure 942 is preferably adapted to enable the remote controller 1 to set, change, add and/or remove one or more configuration parameters of the node 110 (e.g. the IP address and/or the SSID (Service Set Identifier)); the centralized monitoring procedure 943 is preferably adapted to enable the remote controller 1 to monitor the status of the node 110 (e.g. statistical information, number of client devices connected to the node, CPU usage, available memory, download/upload traffic for each client device connected to the node, and similar); and the centralized firmware upgrade procedure 944 is preferably adapted to enable the remote controller 1 to upgrade the specific controller firmwares loaded onto the nodes 110 with a centralized, single procedure.

These operations can be applied by the network administrator to single nodes 110, to a subset of the nodes 110 of LAN 100, or to all nodes 110 of the LAN 100. In any case, the network administrator can execute these operations through the remote controller user interface 18. When the network administrator whishes to configure a node 110, the following procedure can, for example, be executed:

- network administrator starts the remote controller user interface 18 (e.g., web site, tablet application, etc.);
- network administrator provides authentication parameters;
- network administrator selects the node 110 he/she whishes to configure, among the "identified nodes" list (box 904, first section 900 of database 14, shown in FIG. 5A) provided by the remote controller 1;
- network administrator changes one or more configuration parameters of the selected node (e.g. the IP address and/or the SSID);
- remote controller 1 saves the new configuration parameters into the database 14 (third section 920, FIG. 4), in association with the selected node 110;
- network administrator confirms the new configuration;
- remote controller 1 retrieves from the fifth section 940 of database 14 the centralized, uniform configuration procedure to be used to configure the node;
- remote controller 1 executes said configuration procedure to configure the node 110 and, when the execution is completed, returns a confirmation to the network administrator.

A similar sequence can be executed in case of monitoring operations and firmware upgrade operations.

In a preferred embodiment, in case at block 2008 the specific controller firmware cannot be directly loaded onto the specific node 110 (e.g. due to a limited size of the flash memory and/or unsuitable boot loader of the node 110), one or more specific bridge (intermediate) firmwares are first loaded onto the node 110 so as to enable it for loading of the specific controller firmware. Such specific bridge (intermediate) firmwares will be previously stored into the database 14 (for example, in section 930) in association with specific instances of characterizing parameters. The bridge firmwares will be preferably suitably configured to restructure the flash memory and/or change the boot loader (e.g. from vXVorks to OpenWRT compliant) of the node 110 in such a way that the specific controller firmware can be properly loaded onto it. This embodiment might also make use of update of default configuration of the bridge firmware(s) as per procedure at blocks 2006, 2007.

It is noted that even if in the detailed description of the figures, intermediation of the agent device 120 has been described, the present disclosure also comprises the case wherein the agent device 120 is absent and remote controller 1 implements the managing method directly (e.g. in the case the remote controller 1 is located within the LAN 100), without intermediation of the agent device 120.

From the above description it will be clear that, thanks to an initial phase of the management method of the present disclosure (blocks 2001 to 2008), wherein the nodes 110 are first discovered and identified and then upgraded by replacing the stock firmwares with the controller firmwares, through the use of instance-specific procedures, nodes 110 of multiple/generic vendors vendors/models/hardware versions/firmware versions/chipset types can be advantageously handled as such (without requiring any one-by-one modification/adjustment operation), upgraded to the same uniform set of features (that preferably extend the stock feature set) and enabled to be managed by the remote controller 1 via the same uniform set of managing procedures (blocks 2009 and 2011), in a seamless and automatic way, even when the nodes 110 are not manufactured to be centrally managed.

Multiple/generic nodes, included low-cost consumer-grade nodes, can be enabled to be remotely and centrally managed by a single user command (e.g. by a single click onto a suitable app on a smartphone). Indeed, a user by simply clicking on a utility deployed, for example, in its smartphone can trigger the management method of the present disclosure according to which all nodes 110 are discovered, their characterizing parameters are identified, and their stock firmware are upgraded (preferably restoring their current configuration), whereby at the end of the process all nodes 110 are manageable via remote and centralized controller 1, have remote-monitoring and centralized capabilities, have an extended set of features (e.g. auto-roll back on wrong configuration, Wi-Fi client roaming, scheduled firmware upgrades) and have a uniform set of features implemented in a consistent way.

In case it is necessary to restore the stock firmware onto one node 110 of the LAN 100 (or more nodes 110), an opt-out function can be provided for triggering—preferably via a single command—the remote controller 1 to recover the stock firmware of the node 110 (suitably pre-stored into the database 14, for example into section 930) and send it to the node 110. The latter will executes a procedure to restore the stock-firmware, eventually restructuring the flash memory and/or changing the boot loader. The node 110 will thus restarts operating with the stock firmware.

It is also observed that a challenging aspect of using nodes coming from a generic vendor/manufacturer is that they typically come from the factory with a common built-in IP address. This means that any time a new node is inserted into the LAN, conflicts of IP addresses are very likely to arise.

Thanks to the IP conflict avoidance procedure and the subnet conflict avoidance procedure of the present disclosure, IP-addresses conflicts can be centrally managed by the remote controller 1, without the need of deploying any specific software onto the nodes 110 to be managed or assuming any specific procedure or behavior for the nodes.

A central management of IP-addresses conflicts also guarantees that specific policies established by the network administrator are met.

This is advantageous with respect to known solutions for IP-conflicts wherein the nodes need to be configured to execute auto-assignment algorithms (such as for example the MAC-to-IP association algorithm described by U.S. Pat. No. 7,852,819) and the auto-assigned IP addresses might be not compatible with network policies established by the network administrator.

The invention claimed is:

1. A method of remote management in a network, the network comprising a plurality of nodes to be managed by a remote controller, the nodes being identified each by at least one characterizing parameter corresponding to any of predetermined instances of said at least one characterizing parameter, said at least one characterizing parameter being selected from at least one of: vendor, model, hardware version, firmware version, chipset type, wherein:
the remote controller identifies the nodes, by identifying said at least one characterizing parameter of each node;
the remote controller accesses a database comprising said predetermined instances of said at least one characterizing parameter associated with respective upgrade procedures and controller firmwares, said upgrade procedures and controller firmwares being specifically configured for each instance of said at least one characterizing parameters, the controller firmwares implementing a uniform set of features among the nodes and enabling the nodes to be managed by the remote controller by means of a uniform set of managing procedures;
for each identified node, the remote controller retrieves from said database the specific upgrade procedure and the specific controller firmware, which are associated in said database with the instance corresponding to said at least one characterizing parameter identified for the node;
the remote controller executes, for each identified node, the retrieved specific upgrade procedure for loading the retrieved specific controller firmware onto the node; and
after loading the specific controller firmware, the remote controller manages the nodes according to said uniform set of features and by using said uniform set of managing procedures, wherein said uniform set of features and said uniform set of managing procedures are the same for all the nodes and each node has a specific stock firmware, implementing a specific stock set of features and requiring the use by the remote controller of specific managing procedures, including said specific upgrade procedure, and wherein the loading of the retrieved specific controller firmware onto each identified node is executed so as to replace the specific stock firmware with the specific controller firmware, whereby the node is enabled to implement said uniform set of features, instead of said specific stock set of features, and the remote controller is enabled to manage the node by using said uniform set of managing procedures, instead of using said specific managing procedures.

2. The method according to claim 1, wherein:
in said database said predetermined instances of said at least one characterizing parameter are associated with respective configuration extraction procedures, specifically configured for each instance of said at least one characterizing parameters;
for each identified node, the remote controller retrieves from said database the specific configuration extraction procedure which is associated in said database with the instance corresponding to said at least one characterizing parameter identified for the node; and
before executing the retrieved specific upgrade procedure onto the identified node, the remote controller executes the retrieved specific configuration extraction procedure onto the identified node for extracting its current configuration.

3. The method according to claim 2, wherein, before executing the retrieved specific upgrade procedure onto each identified node, the remote controller modifies the retrieved specific controller firmware by updating its default configuration so as to conform at least in part to said extracted current configuration.

4. The method according to claim 3, wherein said default configuration is updated at least with respect to Internet connection parameters, enabling the identified node to access the Internet.

5. The method according to claim 2, wherein after executing the retrieved specific upgrade procedure onto each identified node, the remote controller sends said extracted current configuration to the identified node.

6. The method according to claim 1, wherein when the retrieved specific controller firmware cannot be directly loaded onto the identified node, the remote controller loads at least one specific bridge firmware onto the identified node, before loading the specific controller firmware, said at least one specific bridge firmware being suitably configured to restructure a flash memory and/or change a boot loader of the node in such a way that the specific controller firmware can be properly loaded onto it, and wherein said at least one specific bridge firmware is associated in said database with the instance corresponding to said at least one characterizing parameter identified for the node.

7. The method according to claim 1, wherein the database comprises a plurality of identification procedures for identifying the nodes and for obtaining from them said at least one characterizing parameter, and for each node, the remote controller executes in sequence at least part of said plurality of identification procedures until it successfully identifies the node obtaining from it said at least one characterizing parameter.

8. The method according to claim 7, wherein said identification procedures are specifically configured to respectively work on said predetermined instances of said at least one characterizing parameter.

9. The method according to claim 1, wherein the remote controller executes a discovery procedure for discovering the plurality of nodes, including the node identifiers as Internet Protocol (IP) addresses and/or media access control (MAC) addresses, and wherein the discovery procedure includes trying to reach the plurality of nodes by using a predetermined IP address and/or MAC address, or by using a scanning procedure scanning a predetermined multitude of IP addresses.

10. The method according to claim 9, wherein:
the database comprises a section for storing the node identifiers associated with their corresponding characterizing parameters;
the remote controller executes the identification on the discovered nodes; and for each identified node, the remote controller saves into the database the obtained at least one characterizing parameter in association with the node identifier, as previously discovered during execution of the discovery procedure, so as to fill said section of the database.

11. A system comprising a remote controller, a database and a wide or local area telecommunication network, the network comprising a plurality of nodes to be managed by the remote controller, the nodes being network devices managed by the remote controller, having a hardware-based processor, and being identified each by at least one characterizing parameter corresponding to any of predetermined instances of said at least one characterizing parameter, said at least one characterizing parameter being at least one of a: vendor, model, hardware version, firmware version, chipset type, wherein:
the database is configured to stores a uniform set of managing procedures, which are uniform among the nodes;
the database is configured to store said predetermined instances of said at least one characterizing parameter in association with respective upgrade procedures and controller firmwares, said upgrade procedures and controller firmwares being specifically configured for each instance of said at least one characterizing parameters, the controller firmwares implementing a uniform set of features among the nodes and enabling the nodes to be managed by the remote controller by means of said uniform set of managing procedures;
the remote controller is configured to:
identify the nodes, by identifying said at least one characterizing parameter of each node;
retrieve from said database, for each identified node, the specific upgrade procedure and the specific controller firmware, which are associated in said database with the instance corresponding to said at least one characterizing parameter identified for the node;
execute, for each identified node, the retrieved specific upgrade procedure for loading the retrieved specific controller firmware onto the node;
after the specific controller firmware is loaded onto each node, manage the nodes, according to said uniform set of features and by using said uniform set of managing procedures;
wherein said uniform set of features and said uniform set of managing procedures are the same for all the nodes and each node has a specific stock firmware, implementing a specific stock set of features and requiring the use by the remote controller of specific managing procedures, including said specific upgrade procedure, and wherein the loading of the retrieved specific controller firmware onto each identified node is executed so as to replace the specific stock firmware with the specific controller firmware, whereby the node is enabled to implement said uniform set of features, instead of said specific stock set of features, and the remote controller is enabled to manage the node by using said uniform set of managing procedures, instead of using said specific managing procedures.

12. The system according to claim 11, wherein at least two of the nodes differ from each other for said at least one characterizing parameter.

13. The system according to claim 11, wherein said predetermined instances of said at least one characterizing parameter are associated in said database with specific configuration extraction procedures, and, for each identified node, the remote controller is configured to:
retrieve from said database the specific configuration extraction procedure which is associated in said database with the instance corresponding to said at least one characterizing parameter identified for the node; and
before executing the retrieved specific upgrade procedure onto the identified node, execute the retrieved specific configuration extraction procedure onto the identified node for extracting its current configuration.

14. The system according to claim 11, wherein each of at least part of said predetermined instances of said at least one characterizing parameter is associated in said database with at least one specific bridge firmware, and wherein the remote controller is configured to:
retrieve from said database the at least one specific bridge firmware which is associated in said database with the instance corresponding to the at least one characterizing parameter identified for the node; and
before loading the retrieved specific controller firmware onto the identified node, load said at least one specific bridge firmware onto the identified node, said at least one specific bridge firmware being suitably configured to restructure a flash memory and/or change a boot loader of the identified node so that the specific controller firmware can be properly loaded onto it.

\* \* \* \* \*